United States Patent
Ozturk et al.

(10) Patent No.: US 12,245,290 B2
(45) Date of Patent: *Mar. 4, 2025

(54) RANDOM ACCESS CHANNEL (RACH) RESPONSE (RAR) RECEPTION IN AN UNLICENSED RADIO FREQUENCY (RF) SPECTRUM BAND

(71) Applicant: QUALCOMM Incorporated, San Diego, CA (US)

(72) Inventors: Ozcan Ozturk, San Diego, CA (US); Xiaoxia Zhang, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,439

(22) Filed: Sep. 11, 2023

(65) Prior Publication Data

US 2024/0073955 A1     Feb. 29, 2024

Related U.S. Application Data

(63) Continuation of application No. 17/410,757, filed on Aug. 24, 2021, now Pat. No. 11,910,444, which is a
(Continued)

(51) Int. Cl.
*H04L 12/413* (2006.01)
*H04L 27/26* (2006.01)
(Continued)

(52) U.S. Cl.
CPC ....... *H04W 74/0833* (2013.01); *H04L 12/413* (2013.01); *H04L 27/2692* (2013.01);
(Continued)

(58) Field of Classification Search
CPC ... H04L 12/413; H04L 27/2692; H04L 47/76; H04W 74/0833; H04W 74/008
See application file for complete search history.

(56) References Cited

U.S. PATENT DOCUMENTS

| 11,109,420 B2* | 8/2021 | Ozturk ............. H04W 74/0833 |
| 2016/0262188 A1 | 9/2016 | Zhang et al. |

(Continued)

FOREIGN PATENT DOCUMENTS

| CN | 106559905 A | 4/2017 |
| CN | 106686691 A | 5/2017 |

(Continued)

OTHER PUBLICATIONS

R1-1718303, "Remaining details on PRACH procedures", Oct. 9-13, 2017, pp. 1-11 (Year: 2017).*

(Continued)

*Primary Examiner* — Salvador E Rivas
(74) *Attorney, Agent, or Firm* — Holland & Hart LLP/Qualcomm

(57) ABSTRACT

This disclosure provides systems, methods, and apparatuses to enable a user equipment (UE) and a base station to improve reception of a random access response (RAR) by the UE in an unlicensed spectrum. A network may define a procedure for calculating a random access radio network temporary identifier (RA-RNTI) specific to unlicensed spectrum based on an extended RAR window. The calculation procedure may allow UEs transmitting in the window to calculate a unique RA-RNTI and identify a RAR addressed to the UE using the unique RA-RNTI. Additionally, or alternatively, a base station may transmit a RAR including timing information associated with a corresponding random access request. Accordingly, a UE may receive the RAR and compare the timing information with its own random access request in order to determine whether the RAR is addressed (Continued)

to the UE. Additionally, a UE may monitor a secondary cell or a sub-band for the RAR.

42 Claims, 14 Drawing Sheets

Related U.S. Application Data continuation of application No. 16/777,657, filed on Jan. 30, 2020, now Pat. No. 11,109,420.

(60) Provisional application No. 62/802,841, filed on Feb. 8, 2019.

(51) Int. Cl.
  *H04W 16/14* (2009.01)
  *H04W 72/23* (2023.01)
  *H04W 74/00* (2009.01)
  *H04W 74/0833* (2024.01)

(52) U.S. Cl.
  CPC ........... *H04W 16/14* (2013.01); *H04W 72/23* (2023.01); *H04W 74/00* (2013.01)

(56) References Cited

U.S. PATENT DOCUMENTS

| | | | |
|---|---|---|---|
| 2017/0251460 | A1 | 8/2017 | Agiwal et al. |
| 2018/0132273 | A1 | 5/2018 | Zhang et al. |
| 2018/0227958 | A1 | 8/2018 | Xiong et al. |
| 2018/0324681 | A1 | 11/2018 | Yilmaz et al. |
| 2018/0359784 | A1* | 12/2018 | Agiwal ............. H04W 74/0833 |
| 2018/0359790 | A1* | 12/2018 | Ingale .................. H04W 72/51 |
| 2019/0090283 | A1 | 3/2019 | Yi et al. |
| 2019/0182682 | A1 | 6/2019 | Kim et al. |
| 2019/0208550 | A1 | 7/2019 | Ko et al. |
| 2019/0327764 | A1 | 10/2019 | Yoo et al. |
| 2020/0107235 | A1* | 4/2020 | Peisa .................. H04W 36/304 |
| 2020/0107369 | A1 | 4/2020 | Jeon et al. |
| 2020/0107373 | A1* | 4/2020 | Roy .................... H04L 27/0006 |
| 2020/0112996 | A1* | 4/2020 | Pan .................. H04W 72/0453 |
| 2020/0221506 | A1 | 7/2020 | Jeon et al. |
| 2021/0037439 | A1* | 2/2021 | Harada ............. H04W 36/0072 |
| 2021/0274538 | A1 | 9/2021 | Liu et al. |
| 2021/0274559 | A1* | 9/2021 | Hwang ............... H04L 41/0677 |
| 2022/0061100 | A1 | 2/2022 | Ozturk |

FOREIGN PATENT DOCUMENTS

| | | |
|---|---|---|
| CN | 108476532 A | 8/2018 |
| KR | 20170114971 A | 10/2017 |
| KR | 20180133809 A | 12/2018 |
| TW | 201340758 A | 10/2013 |
| TW | 201401908 A | 1/2014 |
| WO | WO-2013138701 A2 | 9/2013 |
| WO | WO-2018232123 A1 | 12/2018 |
| WO | WO-2019032882 A1 | 2/2019 |

OTHER PUBLICATIONS

"3rd Generation Partnership Project, Technical Specification Group Radio Access Network, NR, Medium Access Control (MAC) protocol specification (Release 15)", 38321-F40, Mobile Competence Centre, 650, Route Des Lucioles, F-06921 Sophia-Antipolis Cedex, France, Jan. 11, 2019, 77 Pages, 3GPP TS 38.321 V15.4.0 (Dec. 2018), XP051591686, Section 5.1, p. 13-p. 22, Section 6.1.5, p. 69-p. 70, Para. 5.18.8 and Para. 6.1.3.18.

"3rd Generation Partnership Project; Technical Specification Group Radio Access Network; Study on NR-Based Access to Unlicensed Spectrum (Release 16)", 3GPP Draft, 3GPP TR 38.889 V16.0.0 (Dec. 2018), 38889-G00, 3rd Generation Partnership Project (3GPP), Mobile Competence Centre, 650, Route Des Lucioles, F-06921 Sophia-Antipolis Cedex, France, Dec. 27, 2018 (Dec. 27, 2018), XP051575597, pp. 1-119, Section 7.2.2.1, p. 51-p. 52, Section 7.2.2.3.1.

International Search Report and Written Opinion—PCT/US2020/016270—ISA/EPO—Jun. 29, 2020 (191276WO).

LG Electronics: "Initial Access and Mobility for NR-U", 3GPP Draft, 3GPP TSG RAN WG1 Ad-Hoc Meeting 1901, R1-1900607, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593454, 19 Pages, Section 3, p. 6-p. 11.

Nokia, et al., "Remaining Details on PRACH Procedures", R1-1718303, 3GPP TSG RAN WG1 Meeting 90bis, Prague, Czech Republic, Oct. 9-13, 2017, 11 Pages.

Partial International Search Report—PCT/US2020/016270—ISAEPO—Apr. 21, 2020 (191276WO).

Taiwan Search Report—TW109103190—TIPO—Jan. 4, 2022 (191276TW).

Taiwan Search Report—TW109103190—TIPO—Jul. 5, 2022 (191276TW).

Taiwan Search Report—TW111136029—TIPO—Oct. 27, 2023 (191276TWD1).

ZTE Corporation., et al., "Msg2 Payload Contents for 2-Step RACH", 3GPP Draft, 3GPP TSG-RAN WG2 Meeting#103-bis, R2-1814034, Msg2 Payload Contents for 2-step RACH, 3rd Generation Partnership Project (3GPP), Mobile Competence Centre, 650, Route Des Lucioles, F-06921 Sophia-Anti Polls Cedex, France, vol. RAN WG2, No. Chengdu. China, Oct. 8, 2018-Oct. 12, 2018, Sep. 27, 2018 (Sep. 27, 2018), XP051523495, 9 Pages, p. 1, lines 21-23.

ZTE: "Further Analysis on Preamble Transmission in NB-IoT", 3GPP Draft, 3GPP TSG-RAN WG2 Meeting #93bis, R2-162360 Further Analysis on Preamble Transmission in NB-IoT, 3rd Generation Partnership Project (3GPP), Mobile Competence Centre, 650, Route Des Lucioles, F-06921 Sophia-Antipolis Cedex, vol. RAN WG2, No. Dubrovnik, Croatia, Apr. 11, 2016-Apr. 15, 2016, Apr. 2, 2016 (Apr. 2, 2016), XP051082398, 6 Pages, Section 2.

ZTE: "Summary of Email Discussion [93bis#07][NB-IOT] RACH Open Issues", 3GPP Draft, 3GPP TSG-RAN WG2 NB-IoT AdHoc, R2-163251—Summary of [93BIS#07][NB-IOT] RACH Open Issues, 3rd Generation Partnership Project (3GPP), Mobile Competence Centre, 650, Route Des Lucioles, F-06921 Sophia-Antipolis Cedex, vol. RAN WG2, No. Sophia Antipolis, France, May 3, 2016-May 4, 2016, May 2, 2016 (May 2, 2016), XP051095119, 14 Pages, Section 2.3, Section 4.

Sony: "Considerations on Initial Access Procedures for NR Unlicensed Operations", 3GPP TSG-RAN WG2 Meeting #103, R2-1817075, Revision of R2-1814736, Spokane, USA, Nov. 12, 2018-Nov. 16, 2018, Nov. 1, 2018, 4 Pages.

* cited by examiner

RANDOM ACCESS CHANNEL (RACH) RESPONSE (RAR) RECEPTION IN AN UNLICENSED RADIO FREQUENCY (RF) SPECTRUM BAND

CROSS REFERENCE

The present application for patent is a Continuation of U.S. patent application Ser. No. 17/410,757 by OZTURK et al., "RANDOM ACCESS CHANNEL (RACH) RESPONSE (RAR) RECEPTION IN AN UNLICENSED RADIO FREQUENCY (FR) SPECTRUM BAND" filed Aug. 24, 2021, which claims the benefit of U.S. patent application Ser. No. 16/777,657 (now U.S. Pat. No. 11,109, 420 granted Aug. 31, 2021) by OZTURK et al., entitled "RANDOM ACCESS CHANNEL (RACH) RESPONSE (RAR) RECEPTION IN AN UNLICENSED RADIO FREQUENCY (FR) SPECTRUM BAND" filed Jan. 30, 2020, which claims the benefit of U.S. Provisional Patent Application No. 62/802,841 by OZTURK et al., entitled "RANDOM ACCESS CHANNEL (RACH) RESPONSE (RAR) RECEPTION IN AN UNLICENSED RADIO FREQUENCY SPECTRUM BAND," filed Feb. 8, 2019, assigned to the assignee hereof, and which is expressly incorporated by reference herein.

TECHNICAL FIELD

This disclosure relates to wireless communications, and more specifically to random access channel (RACH) response (RAR) reception in an unlicensed radio frequency (RF) spectrum band.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources. Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some implementations, a base station and a UE operating in licensed or unlicensed spectrum of an NR network may perform a random access (RACH) procedure in order to complete a handover, adjust a network connection, switch from an idle mode to a connected mode, etc. For example, if a UE is disconnected from the network or otherwise does not have access to uplink or downlink resources, the UE may complete a RACH procedure with a base station before receiving or transmitting data. As such, a delay in completion of a RACH procedure may cause a delay in subsequent communications, resulting in significant latency in the system. In some implementations, delays in the RACH procedure may be based on a UE failing to receive a RACH response (RAR) within a RAR window. For example, in an unlicensed radio frequency spectrum band, a base station may sometimes fail to identify an available opportunity for transmitting the RAR within the window due to a failed listen-before-talk (LBT) procedure, delaying completion of a RACH procedure.

SUMMARY

The systems, methods and devices of this disclosure each have several innovative aspects, no single one of which is solely responsible for the desirable attributes disclosed herein.

One innovative aspect of the subject matter described in this disclosure may be implemented in an apparatus for wireless communications. The apparatus may include a first interface, a second interface, and a processing system. Instructions may be executable by the processing system to cause the first interface to output a random access channel (RACH) preamble associated with a random access radio network temporary identifier (RA-RNTI) for transmission in a first physical RACH (PRACH) occasion. Instructions may be further executable by the processing system to cause the second interface to obtain a RACH response (RAR) message within a RAR window, where the RAR message may include the RA-RNTI and timing information indicating a set of PRACH occasions. Additionally, the processing system may determine whether the set of PRACH occasions includes the first PRACH occasion and may identify whether the RAR message is in response to the RACH preamble based on the determining. In some implementations, the apparatus is included in a user equipment (UE).

Another innovative aspect of the subject matter described in this disclosure may be implemented in a method of wireless communications. The method may include transmitting a RACH preamble associated with an RA-RNTI in a first PRACH occasion and receiving, from a base station, a RAR message within a RAR window, where the RAR message may include the RA-RNTI and timing information indicating a set of PRACH occasions. Additionally, the method may include determining whether the set of PRACH occasions includes the first PRACH occasion and identifying whether the RAR message is in response to the RACH preamble based on the determining.

Another innovative aspect of the subject matter described in this disclosure may be implemented in an additional apparatus for wireless communications. The apparatus may include means for transmitting a RACH preamble associated with an RA-RNTI in a first PRACH occasion and means for receiving, from a base station, a RAR message within a RAR window, where the RAR message may include the RA-RNTI and timing information indicating a set of PRACH occasions. The apparatus may further include means for determining whether the set of PRACH occasions includes the first PRACH occasion and means for identifying whether the RAR message is in response to the RACH preamble based on the determining.

Another innovative aspect of the subject matter described in this disclosure may be implemented in an additional apparatus for wireless communications. The apparatus may include a processor, memory in electronic communication with the processor, and instructions stored in the memory. The instructions may be executable by the processor to cause the apparatus to transmit a RACH preamble associated with an RA-RNTI in a first PRACH occasion and receive, from a base station, a RAR message within a RAR window, where the RAR message may include the RA-RNTI and timing information indicating a set of PRACH occasions. The instructions may be further executable by the processor to cause the apparatus to determine whether the set of PRACH occasions includes the first PRACH occasion and identify whether the RAR message is in response to the RACH preamble based on the determining.

Another innovative aspect of the subject matter described in this disclosure may be implemented in a non-transitory computer-readable medium storing code for wireless communications. The code may include instructions executable by a processor to transmit a RACH preamble associated with an RA-RNTI in a first PRACH occasion and receive, from a base station, a RAR message within a RAR window, where the RAR message may include the RA-RNTI and timing information indicating a set of PRACH occasions. The code also may include instructions executable by a processor to determine whether the set of PRACH occasions includes the first PRACH occasion and identify whether the RAR message is in response to the RACH preamble based on the determining.

In some implementations of the method, apparatuses, and non-transitory computer-readable medium described herein, the determining may include determining that the set of PRACH occasions includes the first PRACH occasion and the identifying may include identifying that the RAR message is in response to the RACH preamble based on the determining. In some implementations, the method, apparatuses, and non-transitory computer-readable medium described herein may further include operations, features, means, or instructions for communicating with the base station using information received in the RAR message based on identifying that the RAR message is in response to the RACH preamble.

In some implementations of the method, apparatuses, and non-transitory computer-readable medium described herein, the determining may include determining that the set of PRACH occasions excludes the first PRACH occasion and the identifying may include identifying that the RAR message is in response to an additional RACH preamble different from the RACH preamble based on the determining. In some implementations, the method, apparatuses, and non-transitory computer-readable medium described herein may further include operations, features, means, or instructions for monitoring for an additional RAR message within the RAR window that is in response to the RACH preamble based on identifying that the RAR message is in response to the additional RACH preamble different from the RACH preamble.

In some implementations, the method, apparatuses, and non-transitory computer-readable medium described herein may further include operations, features, means, or instructions for monitoring, or obtaining monitoring information, for the RAR message within the RAR window, where the receiving or obtaining may be based on the monitoring.

In some implementations, the method, apparatuses, and non-transitory computer-readable medium described herein may include operations, features, means, or instructions for monitoring for the RAR message on a primary cell and at least one of one or more secondary cells and one or more sub-bands.

In some implementations, the method, apparatuses, and non-transitory computer-readable medium described herein may further include operations, features, means, or instructions for operating according to a two-step RACH procedure, determining that the additional RAR message that is in response to the RACH preamble is not received within the RAR window based on the monitoring, and switching to operate according to a four-step RACH procedure based on determining that the additional RAR message is not received.

In some implementations, the method, apparatuses, and non-transitory computer-readable medium described herein may further include operations, features, means, or instructions for determining to monitor for the RAR message on the at least one of the one or more secondary cells and the one or more sub-bands based on at least one of received system information, received dedicated signaling, and a configuration of the UE.

In some implementations, the method, apparatuses, and non-transitory computer-readable medium described herein may further include operations, features, means, or instructions for starting a RAR window timer for the RAR window after transmitting the RACH preamble and transmitting a data payload transmission associated with the RACH preamble, where the monitoring for the RAR message within the RAR window may overlap in time with the transmitting the data payload transmission.

In some implementations, the method, apparatuses, and non-transitory computer-readable medium described herein may further include operations, features, means, or instructions for starting a RAR window timer for the RAR window after transmitting the RACH preamble and transmitting a data payload transmission associated with the RACH preamble an amount of time after transmitting the RACH preamble such that the monitoring for the RAR message within the RAR window may be non-overlapping in time with the transmitting the data payload transmission.

In some implementations of the method, apparatuses, and non-transitory computer-readable medium described herein, the set of PRACH occasions may include a second PRACH occasion and the timing information may include a difference in time between a first time corresponding to the second PRACH occasion and a second time at which the RAR message is received.

In some implementations of the method, apparatuses, and non-transitory computer-readable medium described herein, the timing information may include at least a portion of a system frame number (SFN) corresponding to the set of PRACH occasions. In some implementations of the method, apparatuses, and non-transitory computer-readable medium described herein, the portion of the SFN may include a last portion of the SFN or a last two bits of the SFN.

In some implementations, the method, apparatuses, and non-transitory computer-readable medium described herein may further include operations, features, means, or instructions for identifying a set of PRACH occasions for transmitting the RACH preamble and selecting the first PRACH occasion from the set of PRACH occasions for transmitting the RACH preamble, where the first PRACH occasion may be an earliest available PRACH occasion of the set of PRACH occasions.

In some implementations, the method, apparatuses, and non-transitory computer-readable medium described herein may further include operations, features, means, or instructions for calculating the RA-RNTI based on the selected first PRACH occasion.

In some implementations of the method, apparatuses, and non-transitory computer-readable medium described herein, the timing information may be received in at least one of downlink control information (DCI), a medium access control element (MAC CE), or a physical downlink shared channel (PDSCH) payload.

In some implementations of the method, apparatuses, and non-transitory computer-readable medium described herein, the RACH preamble may correspond to a RACH message 1 in a four-step RACH procedure or a RACH message A (msgA) in a two-step RACH procedure, and the RAR message may correspond to a RACH message 2 in the four-step RACH procedure or a RACH message B (msgB) in the two-step RACH procedure.

Another innovative aspect of the subject matter described in this disclosure may be implemented in an additional apparatus for wireless communications. The apparatus may include a first interface, a second interface, and a processing system. Instructions may be executable by the processing system to cause the first interface to obtain a RACH preamble associated with an RA-RNTI in a PRACH occasion. The processing system may determine timing information corresponding to receiving the RACH preamble, where the timing information may indicate a set of PRACH occasions including the PRACH occasion. Instructions may be further executable by the processing system to output, in response to the RACH preamble, a RAR message for transmission within a RAR window, where the RAR message may include the RA-RNTI and the timing information indicating the set of PRACH occasions. In some implementations, the apparatus is included in a base station.

Another innovative aspect of the subject matter described in this disclosure may be implemented in a method of wireless communications. The method may include receiving, from a UE, a RACH preamble associated with a RA-RNTI in a PRACH occasion and determining timing information corresponding to receiving the RACH preamble, where the timing information may indicate a set of PRACH occasions including the PRACH occasion. The method may further include transmitting, to the UE and in response to the RACH preamble, a RAR message within a RAR window, where the RAR message may include the RA-RNTI and the timing information indicating the set of PRACH occasions.

Another innovative aspect of the subject matter described in this disclosure may be implemented in an additional apparatus for wireless communications. The apparatus may include means for receiving, from a UE, a RACH preamble associated with a RA-RNTI in a PRACH occasion and means for determining timing information corresponding to receiving the RACH preamble, where the timing information indicates a set of PRACH occasions including the PRACH occasion. The apparatus may further include means for transmitting, to the UE and in response to the RACH preamble, a RAR message within a RAR window, where the RAR message may include the RA-RNTI and the timing information indicating the set of PRACH occasions.

Another innovative aspect of the subject matter described in this disclosure may be implemented in an additional apparatus for wireless communications. The apparatus may include a processor, memory in electronic communication with the processor, and instructions stored in the memory. The instructions may be executable by the processor to cause the apparatus to receive, from a UE, a RACH preamble associated with a RA-RNTI in a PRACH occasion and determine timing information corresponding to receiving the RACH preamble, where the timing information indicates a set of PRACH occasions including the PRACH occasion. The instructions may be further executable by the processor to cause the apparatus to transmit, to the UE and in response to the RACH preamble, a RAR message within a RAR window, where the RAR message may include the RA-RNTI and the timing information indicating the set of PRACH occasions.

Another innovative aspect of the subject matter described in this disclosure may be implemented in a non-transitory computer-readable medium storing code for wireless communications is described. The code may include instructions executable by a processor to receive, from a UE, a RACH preamble associated with a RA-RNTI in a PRACH occasion and determine timing information corresponding to receiving the RACH preamble, where the timing information indicates a set of PRACH occasions including the PRACH occasion. The code also may include instructions executable by a processor to transmit, to the UE and in response to the RACH preamble, a RAR message within a RAR window, where the RAR message may include the RA-RNTI and the timing information indicating the set of PRACH occasions.

In some implementations, the method, apparatuses, and non-transitory computer-readable medium described herein may further include operations, features, means, or instructions for communicating with the UE using information transmitted in the RAR message based on the RAR message being in response to the RACH preamble.

In some implementations, the method, apparatuses, and non-transitory computer-readable medium described herein may further include operations, features, means, or instructions for receiving, from an additional UE, an additional RACH preamble with the RA-RNTI in an additional PRACH occasion different from the PRACH occasion. The method, apparatuses, and non-transitory computer-readable medium described herein may further include operations, features, means, or instructions for determining additional timing information corresponding to receiving the additional RACH preamble, where the additional timing information may indicate an additional set of PRACH occasions including the additional PRACH occasion and excluding the PRACH occasion, and transmitting, to the additional UE and in response to the additional RACH preamble, an additional RAR message within the RAR window, where the additional RAR message may include the RA-RNTI and the additional timing information indicating the additional set of PRACH occasions.

In some implementations of the method, apparatuses, and non-transitory computer-readable medium described herein, the timing information may include a difference in time between a first time corresponding to the PRACH occasion and a second time at which the RAR message is transmitted.

In some implementations of the method, apparatuses, and non-transitory computer-readable medium described herein, the timing information may include at least a portion of an SFN corresponding to the PRACH occasion. In some implementations of the method, apparatuses, and non-transitory computer-readable medium described herein, the portion of the SFN may include a last portion of the SFN or a last two bits of the SFN.

In some implementations of the method, apparatuses, and non-transitory computer-readable medium described herein, the RAR message may be transmitted on at least one of a primary cell, a secondary cell, and a sub-band.

In some implementations, the method, apparatuses, and non-transitory computer-readable medium described herein may further include operations, features, means, or instructions for determining the at least one of the primary cell, the secondary cell, and the sub-band based on at least one of transmitted system information, transmitted dedicated signaling for a UE, and a configuration of the UE.

In some implementations of the method, apparatuses, and non-transitory computer-readable medium described herein, the RA-RNTI may be based on the PRACH occasion.

In some implementations of the method, apparatuses, and non-transitory computer-readable medium described herein, the timing information may be transmitted in at least one of DCI, a MAC CE, or a PDSCH payload.

In some implementations of the method, apparatuses, and non-transitory computer-readable medium described herein, the RACH preamble may correspond to a RACH message 1 in a four-step RACH procedure or a RACH (msgA) in a two-step RACH procedure, and the RAR message may correspond to a RACH message 2 in the four-step RACH procedure or a RACH (msgB) in the two-step RACH procedure.

Another innovative aspect of the subject matter described in this disclosure may be implemented in an additional apparatus for wireless communications. The apparatus may include a processing system and a first interface. The processing system may determine to transmit a RACH preamble in either a licensed radio frequency spectrum band or an unlicensed radio frequency spectrum band and select a function for calculating an RA-RNTI, where the function may be selected from a set of functions based on whether the RACH preamble is determined to be transmitted in the licensed radio frequency spectrum band or the unlicensed radio frequency spectrum band. Further, the processing system may calculate the RA-RNTI using the selected function and based on a PRACH occasion. Instructions may be executable by the processing system to cause the first interface to output the RACH preamble associated with the calculated RA-RNTI for transmission in the PRACH occasion. In some implementations, the apparatus is included in a UE.

Another innovative aspect of the subject matter described in this disclosure may be implemented in a method of wireless communications. The method may include determining to transmit a RACH preamble in either a licensed radio frequency spectrum band or an unlicensed radio frequency spectrum band and selecting a function for calculating a RA-RNTI, where the function is selected from a set of functions based on whether the RACH preamble is determined to be transmitted in the licensed radio frequency spectrum band or the unlicensed radio frequency spectrum band. The method may further include calculating the RA-RNTI using the selected function and based on a PRACH occasion and transmitting the RACH preamble associated with the calculated RA-RNTI in the PRACH occasion.

Another innovative aspect of the subject matter described in this disclosure may be implemented in an additional apparatus for wireless communications. The apparatus may include means for determining to transmit a RACH preamble in either a licensed radio frequency spectrum band or an unlicensed radio frequency spectrum band and means for selecting a function for calculating a RA-RNTI, where the function is selected from a set of functions based on whether the RACH preamble is determined to be transmitted in the licensed radio frequency spectrum band or the unlicensed radio frequency spectrum band. The apparatus may further include means for calculating the RA-RNTI using the selected function and based on a PRACH occasion and means for transmitting the RACH preamble associated with the calculated RA-RNTI in the PRACH occasion.

Another innovative aspect of the subject matter described in this disclosure may be implemented in an additional apparatus for wireless communications. The apparatus may include a processor, memory in electronic communication with the processor, and instructions stored in the memory. The instructions may be executable by the processor to cause the apparatus to determine to transmit a RACH preamble in either a licensed radio frequency spectrum band or an unlicensed radio frequency spectrum band and select a function for calculating a RA-RNTI, where the function is selected from a set of functions based on whether the RACH preamble is determined to be transmitted in the licensed radio frequency spectrum band or the unlicensed radio frequency spectrum band. The instructions may be further executable by the processor to cause the apparatus to calculate the RA-RNTI using the selected function and based on a PRACH occasion and transmit the RACH preamble associated with the calculated RA-RNTI in the PRACH occasion.

Another innovative aspect of the subject matter described in this disclosure may be implemented in a non-transitory computer-readable medium storing code for wireless communications. The code may include instructions executable by a processor to determine to transmit a RACH preamble in either a licensed radio frequency spectrum band or an unlicensed radio frequency spectrum band and select a function for calculating a RA-RNTI, where the function is selected from a set of functions based on whether the RACH preamble is determined to be transmitted in the licensed radio frequency spectrum band or the unlicensed radio frequency spectrum band. The code may further include instructions executable by a processor to calculate the RA-RNTI using the selected function and based on a PRACH occasion and transmit the RACH preamble associated with the calculated RA-RNTI in the PRACH occasion.

In some implementations of the method, apparatuses, and non-transitory computer-readable medium described herein, a RAR window for the unlicensed radio frequency spectrum band may span an amount of time greater than a RAR window for the licensed radio frequency spectrum band.

In some implementations of the method, apparatuses, and non-transitory computer-readable medium described herein, the RACH preamble is determined to be transmitted in the unlicensed radio frequency spectrum band and the selected function for calculating the RA-RNTI outputs a different value for each PRACH occasion within the RAR window for the unlicensed radio frequency spectrum band.

In some implementations, the method, apparatuses, and non-transitory computer-readable medium described herein may further include operations, features, means, or instructions for selecting a slot time index range for the RACH preamble such that the RA-RNTI is unique within the RAR window for the unlicensed radio frequency spectrum band.

In some implementations, the method, apparatuses, and non-transitory computer-readable medium described herein may further include operations, features, means, or instructions for monitoring (or obtaining monitoring information), within a RAR window, for a RAR message in response to the RACH preamble, receiving the RAR message within the RAR window, where the RAR message may include the RA-RNTI, and identifying that the RAR message may be in response to the RACH preamble based on the RA-RNTI received in the RAR message.

In some implementations of the method, apparatuses, and non-transitory computer-readable medium described herein, the monitoring may include operations, features, means, or instructions for monitoring for the RAR message on a primary cell and at least one of one or more secondary cells and one or more sub-bands.

In some implementations, the method, apparatuses, and non-transitory computer-readable medium described herein may further include operations, features, means, or instructions for determining to monitor for the RAR message on the at least one of the one or more secondary cells and the one or more sub-bands based on at least one of received system information, received dedicated signaling, and a configuration of a UE.

In some implementations of the method, apparatuses, and non-transitory computer-readable medium described herein, calculating the RA-RNTI using the selected function and based on the PRACH occasion may further include operations, features, means, or instructions for calculating the RA-RNTI based on at least one of a first orthogonal frequency division multiplexing (OFDM) symbol of the PRACH occasion, a first slot of the PRACH occasion in a system frame, a frequency domain index of the PRACH occasion, and an uplink carrier identifier for transmitting the RACH preamble.

In some implementations, the method, apparatuses, and non-transitory computer-readable medium described herein may further include operations, features, means, or instructions for identifying a set of PRACH occasions for transmitting the RACH preamble and selecting the PRACH occasion from the set of PRACH occasions for transmitting the RACH preamble, where the PRACH occasion may be an earliest available PRACH occasion of the set of PRACH occasions.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
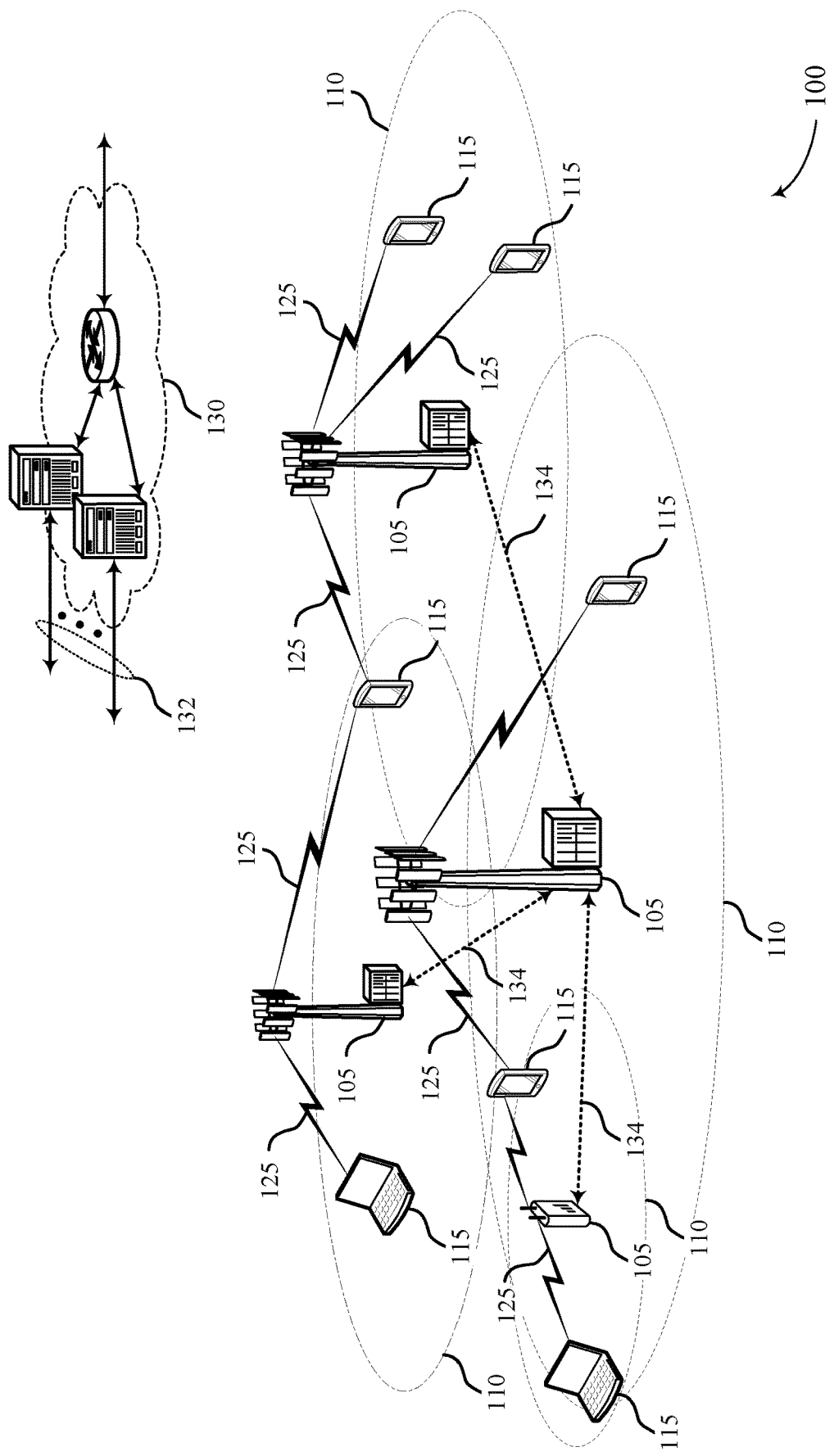
FIGS. 1 and 2 show system diagrams of example wireless communications systems.

The following description is directed to certain implementations for the purposes of describing the innovative aspects of this disclosure. However, a person/one having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), New Radio (NR), AMPS, or other known signals that are used to communicate within a wireless, cellular or internet of things (IOT) network, such as a system utilizing 3G, 4G or 5G, or further implementations thereof, technology.

In some systems (such as NR systems), a user equipment (UE) may perform a random access channel (RACH) procedure with a base station to request resources for communications (such as uplink or downlink transmissions) with the base station. In some implementations, the UE may send a RACH request to the base station, which may include a RACH preamble and an optional payload (such as in a two-step RACH procedure), where the RACH request may be associated with a unique RACH radio network temporary identifier (such as RA-RNTI). Following reception of the RACH request, the base station may determine access information to send to the UE, which the base station may include in a RACH response (RAR). The base station may calculate the same RA-RNTI based on the received RACH preamble and may transmit the RAR with the calculated RA-RNTI to the UE within a window of time after receiving the RACH request. The UE may determine that the RAR is in response to its transmitted RACH request based on the RA-RNTI in the RAR matching the RA-RNTI calculated by the UE. In some implementations, the base station and the UE may operate in a shared or unlicensed spectrum, in which case either or both of the devices may employ a listen before talk or listen before transmit (LBT) procedure before transmitting a RACH message (such as a RACH request or a RAR).

In some implementations, the network may extend the window for transmitting the RAR due to the LBT procedures involved. For example, to increase the number of LBT opportunities within the RAR window and, correspondingly, improve the reliability of the RACH procedure, the wireless devices may use an RAR window in an unlicensed radio frequency spectrum band that is longer than an RAR window used in a licensed radio frequency spectrum band. The window extension in the unlicensed spectrum may cause some UEs and base stations to calculate identical (non-unique) RA-RNTIs corresponding to RACH requests with overlapping RAR windows. As such, a base station may address a RAR to a specific RA-RNTI (to a specific UE), but two or more UEs may share the same RA-RNTI, receive the RAR in a corresponding RAR window, and each UE may determine that the RAR is in response to its own RACH request. To mitigate such collisions, the network may employ methods to improve identification of the RAR by the correct UE and also may employ general methods for improving reception of the RAR when employing LBT procedures.

For example, the network may define a method for calculating RA-RNTI that is specific to a shared or unlicensed spectrum and may be based on an extended RAR window. In some implementations, the calculation method may allow each UE to calculate a unique RA-RNTI for an extended RAR window length, such that each UE may identify a RAR addressed to the UE by the RA-RNTI to which the RAR is addressed. Additionally, or alternatively, a base station may transmit a RAR including timing information associated with a corresponding RACH request.

Accordingly, a UE may receive and decode a RAR addressed to its RA-RNTI and may compare the timing information with the timing information of its own transmitted RACH request. In some implementations, the UE may determine that the RACH request is directed to the UE if the timing information in the RAR matches or includes the timing information of the RACH request transmitted by the UE. The timing information may differentiate RAR messages with the same RA-RNTIs from one another within an extended RAR window.

In some implementations, the UE may mitigate LBT delays by monitoring one or more secondary cells (SCells) or sub-bands that are different from the primary cell (PCell) designated for RAR transmission. For example, a UE may be configured to monitor the one or more S Cells or sub-bands, or a base station may signal the UE (such as via radio resource control (RRC) signaling) to monitor the one or more SCells or sub-bands.

Particular implementations of the subject matter described in this disclosure can be implemented to realize one or more of the following potential advantages. The methods described herein may allow a UE and a base station to correctly perform a RACH procedure in a shared or unlicensed spectrum by improving reception of the RAR at the UE. In some implementations, the UE may employ a spectrum-specific method for calculating an RA-RNTI, thereby ensuring that each UE monitoring for a response in an RAR window is monitoring for a RAR with a unique RA-RNTI in that window. In some implementations, a base station may include timing information in a RAR, which may allow a UE to identify whether the RAR is directed to that particular UE. These implementations may support extended RAR windows in unlicensed radio frequency spectrum bands, increasing the number of LBT opportunities for a base station to transmit a RAR message and, correspondingly, improving the reliability of RACH procedures. Additionally, or alternatively, a UE may monitor one or more SCells or sub-bands that are different from the PCell designated for transmission of a RAR. As such, a base station transmitting the RAR may have further additional opportunities to pass an LBT procedure using the different resources provided by the one or more SCells or sub-bands.

FIG. 1 shows a system diagram of an example wireless communications system 100. The wireless communications system 100 supports RAR reception in an unlicensed radio frequency spectrum band and includes base stations 105, UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, wireless communications system 100 may support enhanced broadband communications, ultra-reliable (such as mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (such as macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions also may be called forward link transmissions while uplink transmissions also may be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some implementations, a base station 105 may be movable and therefore provide communication coverage for a moving geographic coverage area 110. In some implementations, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (over a carrier), and may be associated with an identifier for distinguishing neighboring cells (such as a physical cell identifier (PCID), a virtual cell identifier (VCID)) operating via the same or a different carrier. In some implementations, a carrier may support multiple cells, and different cells may be configured according to different protocol types (such as machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (such as a sector) over which the logical entity operates.

UEs 115 may be dispersed throughout the wireless communications system 100, and each UE 115 may be stationary or mobile. A UE 115 also may be referred to as a mobile device, a wireless device, a remote device, a handheld device, or a subscriber device, or some other suitable terminology, where the "device" also may be referred to as a unit, a station, a terminal, or a client. A UE 115 also may be a personal electronic device such as a cellular phone, a personal digital assistant (PDA), a tablet computer, a laptop computer, or a personal computer. In some implementations, a UE 115 also may refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (such as via Machine-to-Machine (M2M) communication). M2M communication or MTC may refer to data communication technologies that allow devices to communicate with one another or a base station 105 without human intervention. In some implementations, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (a mode that supports one-way communication via transmission or reception, but not transmission and reception simultaneously). In some implementations half-duplex communications may be performed at a reduced peak rate. Other power conservation techniques for UEs 115 include entering a power saving "deep sleep" mode when not engaging in active communications, or operating over a limited bandwidth (according to narrowband communications). In some implementations, UEs 115 may be designed to support critical functions (such as mission critical functions), and a wireless communications system 100 may be configured to provide ultra-reliable communications for these functions.

In some implementations, a UE 115 also may be able to communicate directly with other UEs 115 (such as using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other implementations, D2D communications are carried out between UEs 115 without the involvement of a base station 105.

Base stations 105 may communicate with the core network 130 and with one another. For example, base stations 105 may interface with the core network 130 through backhaul links 132 (such as via an S1, N2, N3, or another interface). Base stations 105 may communicate with one another over backhaul links 134 (such as via an X2, Xn, or other interface) either directly (such as directly between base stations 105) or indirectly (such as via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (such as control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (such as radio heads and access network controllers) or consolidated into a single network device (such as a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (such as less than 100 km) compared to transmission using the smaller frequencies and longer waves of the high frequency (HF) or very high frequency (VHF) portion of the spectrum below 300 MHz.

Wireless communications system 100 also may operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 also may operate in an extremely high frequency (EHF) region of the spectrum (such as from 30 GHz to 300 GHz), also known as the millimeter band. In some implementations, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a carrier aggregation configuration in conjunction with component carriers operating in a licensed band (such as LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some implementations, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (such as a base station 105) and a receiving device (such as a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (such as the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which also may be referred to as spatial filtering, directional transmission, or directional reception, is a signal processing technique that may be used at a transmitting device or a receiving device (such as a base station 105 or a UE 115) to shape or steer an antenna beam (such as a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (with respect to the antenna array of the transmitting device or receiving device, or with respect to some other orientation).

In some implementations, a base station 105 may use multiple antennas or antenna arrays to conduct beamforming operations for directional communications with a UE 115. For instance, some signals (such as synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (by the base station 105 or a receiving device, such as a UE 115) a beam direction for subsequent transmission or reception by the base station 105.

Some signals, such as data signals associated with a particular receiving device, may be transmitted by a base station 105 in a single beam direction (such as a direction associated with the receiving device, such as a UE 115). In some implementations, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (such as for identifying a beam direction for subsequent transmission or reception by the UE 115), or transmitting a signal in a single direction (such as for transmitting data to a receiving device).

A receiving device (such as a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some implementations a receiving device may use a single receive beam to receive along a single beam direction (such as when receiving a data signal). The single receive beam may be aligned in a beam direction determined based at least in part on listening according to different receive beam directions (such as a beam direction determined to have a highest signal strength, highest signal-to-noise ratio, or otherwise acceptable signal quality based at least in part on listening according to multiple beam directions).

In some implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC)

layer may perform packet segmentation and reassembly to communicate over logical channels. A medium access control (MAC) layer may perform priority handling and multiplexing of logical channels into transport channels. The MAC layer also may use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as signal-to-noise conditions). In some implementations, a wireless device may support same-slot HARQ feedback, where the device may provide HARQ feedback in a specific slot for data received in a previous symbol in the slot. In other implementations, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In other implementations, a smallest scheduling unit of the wireless communications system 100 may be shorter than a subframe or may be dynamically selected (such as in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (such as an evolved universal mobile telecommunication system terrestrial radio access (E-UTRA) absolute radio frequency channel number (EARFCN)), and may be positioned according to a channel raster for discovery by UEs 115. Carriers may be downlink or uplink (such as in an FDD mode), or be configured to carry downlink and uplink communications (such as in a TDD mode). In some implementations, signal waveforms transmitted over a carrier may be made up of multiple sub-carriers (such as using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (such as LTE, LTE-A, LTE-A Pro, NR). For example, communications over a carrier may be organized according to TTIs or slots, each of which may include user data as well as control information or signaling to support decoding the user data. A carrier also may include dedicated acquisition signaling (such as synchronization signals or system information, etc.) and control signaling that coordinates operation for the carrier. In some implementations (such as in a carrier aggregation configuration), a carrier also may have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some implementations, control information transmitted in a physical control channel may be distributed between different control regions in a cascaded manner (between a common control region or common search space and one or more UE-specific control regions or UE-specific search spaces).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of predetermined bandwidths for carriers of a particular radio access technology (such as 1.4, 3, 5, 10, 15, 20, 40, or 80 MHz). In some implementations, each served UE 115 may be configured for operating over portions or all of the carrier bandwidth. In some other implementations, some UEs 115 may be configured for operation using a narrowband protocol type that is associated with a pre-defined portion or range (such as a set of subcarriers or RBs) within a carrier (such as "in-band" deployment of a narrowband protocol type).

In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (such as spatial layers), and the use of multiple spatial layers may further increase the data rate for communications with a UE 115.

Devices of the wireless communications system 100 (such as base stations 105 or UEs 115) may have a hardware configuration that supports communications over a particular carrier bandwidth, or may be configurable to support communications over one of a set of carrier bandwidths. In some implementations, the wireless communications system 100 may include base stations 105 and UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (when multiple serving cells have a suboptimal or non-ideal backhaul link). An eCC also may be configured for use in unlicensed spectrum or shared spectrum (such as where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (such as to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (according to frequency channel or carrier bandwidths of 20, 40, 60, 80 MHz, etc.) at reduced symbol durations (such as 16.67 microseconds). A TTI in eCC may consist of one or multiple symbol periods. In some implementations, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some implementations, NR shared spectrum may increase spectrum utilization and spectral efficiency, specifically through dynamic vertical (such as across the frequency domain) and horizontal (such as across the time domain) sharing of resources.

Wireless devices operating in a shared or unlicensed spectrum (such as within an NR network) may participate in a two-step RACH procedure or a four-step RACH procedure when connecting to the network or requesting new resources. In some implementations, a UE 115 may select a RACH occasion (from designated RACH resources, such as a physical RACH (PRACH) occasion) to send a RACH request (such as message A (msgA) in two-step RACH or message 1 (msg1) in four-step RACH) to a base station 105. The RACH request may include a RACH preamble selected by the UE 115 and may be associated with an RA-RNTI. In the implementation of two-step RACH, the RACH request also may include a payload with data contents that may be equivalent or similar to message 3 (msg3) in a four-step RACH procedure. The UE 115 may transmit this payload on a physical uplink shared channel (PUSCH). In some implementations, the base station 105 may transmit a RAR (such as message B (msgB) in two-step RACH or message 2 (msg2) in four-step RACH) to the UE 115. In some implementations, the RAR may include control information on a downlink control channel (such as a physical downlink control channel (PDCCH)) sent to the UE 115. Additionally, the RAR may contain timing advance information and resource allocation and may be scrambled using the RA-RNTI value associated with the UE 115. In two-step RACH, the base station 105 may combine the equivalent contents of a RACH msg2 and a RACH message 4 (msg4) from four-step RACH to create msgB.

When participating in either a two-step or four-step RACH procedure, the UE 115 may calculate an RA-RNTI corresponding to the transmission of the RACH request to the base station 105. In some implementations, the UE 115 may use the calculated RA-RNTI to decode future RACH messages (such as the RAR) received from the base station 105. Additionally, the UE 115 may determine that a RACH message is intended for the UE 115 based on a successful decoding procedure using the calculated RA-RNTI. As such, a network may take steps to ensure that one or more UEs 115 participating in RACH procedures over a same time period calculate unique RA-RNTIs, in order for the UEs 115 to correctly identify RACH communications intended for them. In some implementations, a UE 115 and base station 105 may calculate an RA-RNTI using parameters such as an index of a first OFDM symbol of the RACH occasion used to transmit the RACH request, the time and frequency index of the first slot of the RACH occasion, and a carrier identifier (ID) for the carrier used for the RACH request.

For example, the equation to calculate the RA-RNTI may be expressed as:

$$\text{RA-RNTI}=1+s_{ID}+14\times t_{ID}+14\times 80\times f_{ID}+14\times 80\times 8\times \text{UL}_{carrier\ ID}, \quad (1)$$

where $s_{ID}$ is the index of the first OFDM symbol of the RACH occasion ($0 \leq s_{ID} < 14$), $t_{ID}$ is the index of the first slot of the RACH occasion in a system frame ($0 \leq t_{ID} < 10$), $f_{ID}$ is the index of the RACH occasion in the frequency domain ($0 \leq f_{ID} < 8$), and $\text{UL}_{carrier\ ID}$ is the uplink carrier used for RACH preamble transmission (0 for normal uplink carrier, and 1 for supplemental uplink carrier). The valid range of the slot time index, $t_{ID}$, may be subcarrier spacing (SCS) dependent. For example, a maximum value for $t_{ID}$ may be 10, 20, 40, or 80 depending on whether the SCS is 15, 30, 60, or 120 kilohertz (kHz), respectively.

In some implementations, a UE 115 and a base station 105 may communicate over a shared or unlicensed spectrum, in which case one or both of the UE 115 and the base station 105 may participate in LBT procedures before transmitting RACH messages (such as a RACH request or RAR). For example, a UE 115 or a base station 105 may monitor a channel or a set of RACH occasions to detect other communications. If the UE 115 or the base station 105 does not detect other communications, the UE 115 or the base station 105 may determine to transmit on the monitored channel or RACH occasion. Additionally, or alternatively, if the UE 115 or the base station 105 does detect other communications, the UE 115 or the base station 105 may determine an LBT failure and may perform an LBT procedure for another channel or RACH occasion. In some implementations, a base station 105 may be unable to transmit a RAR within a given RAR window due to LBT failures. Similarly, a UE 115 may be unable to transmit the second part of the RACH request (such as msgA payload or msg3) due to LBT failures.

To improve the likelihood of a base station 105 passing an LBT procedure within a RAR window, devices operating using LBT procedures may be configured to extend the RAR window for communications in an unlicensed band (for example, as compared to a RAR window for communications in a licensed band), where the window may be used by the UE 115 to determine when to monitor for a RAR. In some implementations, the amount of time that the window is extended may depend on symbol duration or SCS. In some implementations, if the window size is extended beyond a defined amount of time (such as 10 ms, 20 ms, etc.), the RA-RNTI calculation method for a licensed band may yield non-unique RA-RNTI values for two or more UEs 115 transmitting RACH requests within the window. Therefore, collision may occur between RARs to the two or more UEs 115, such that each of the two or more UEs 115 may determine that a same RAR is directed to their own RACH request.

In some implementations, a UE 115 may monitor for the RAR using a PCell and one or more frequency sub-bands, SCells, or both, where the sub-bands and the SCells may be different than the sub-band or PCell designated for transmitting the RAR. In some implementations, this broadened monitoring may allow the base station 105 and the UE 115 to avoid delays caused by LBT failure at a PCell or primary sub-band. In some implementations, a UE 115 may employ a different method for calculating RA-RNTI when communicating on a shared or unlicensed spectrum, such that the RA-RNTI calculations may result in unique RA-RNTIs for each UE 115 transmitting a RACH request within the same RAR window extended for the shared or unlicensed spectrum. Additionally, or alternatively, a base station 105 may include timing information within RAR transmissions to a UE 115, identifying a time or set of times associated with the RACH request (such as a time of a RACH occasion) from the UE 115. As such, if the timing information matches or includes the time associated with the RACH request at the UE 115, the UE 115 may determine that the RAR is directed towards the UE 115 (and not to another UE 115).

Figure 2:
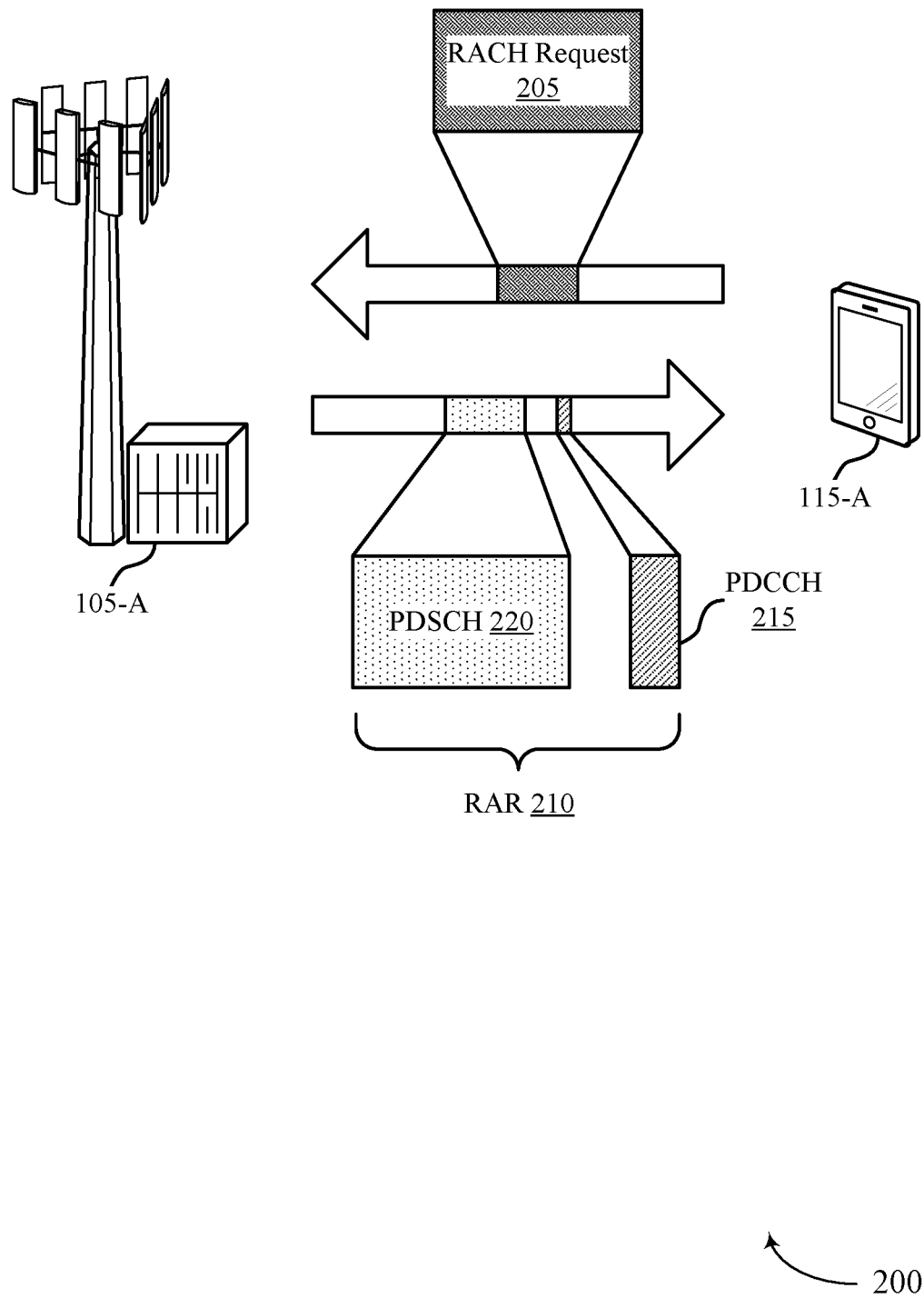

FIG. 2 shows a system diagram of an example wireless communications system 200. The wireless communications system 200 supports RAR reception in an unlicensed radio frequency spectrum band. In some implementations, wireless communications system 200 may implement aspects of wireless communications system 100 and may include a UE 115-a and a base station 105-a, which may be examples of a UE 115 and a base station 105 described with reference to FIG. 1. For example, the UE 115-a may transmit a RACH request 205 to the base station 105-a and the base station 105-a may transmit a RAR 210 to UE 115-a, as described with reference to FIG. 1. Moreover, the RACH communications between the UE 115-a and the base station 105-a may be part of a two-step RACH procedure or a four-step RACH procedure.

In some implementations, the UE 115-a and the base station 105-a may communicate using a shared or unlicensed spectrum within, for example, an NR network. As such, UE 115-a and base station 105-a may participate in an LBT procedure before transmitting RACH messages (for either two-step or four-step RACH). Additionally, a window for the RAR 210 may be extended to account for LBT delays. As described with reference to FIG. 1, the window may be extended beyond a given time period (such as 20 ms), which may cause an RA-RNTI calculation at the UE 115-a to yield a same value as an RA-RNTI calculation at a separate UE 115 monitoring for a RAR within the same window. Accordingly, calculating the same RA-RNTI may cause collisions such that each UE 115 may determine the RAR 210 to be in response to its own RACH request. Therefore, the base station 105-a and the UE 115-a may enhance the reception of the correct RAR 210 by one or more of employing a modified RA-RNTI calculation, including timing information in the RAR 210, using a monitoring scheme for the RAR 210, and employing a modified window timer.

In some implementations, the UE 115-a may send the RACH request 205 to the base station 105-a (using a PCell or an SCell) after completing an LBT procedure. As such, the MAC layer of the UE 115-a may receive information regarding a RACH occasion used for transmitting the RACH request 205 in order to correctly calculate an RA-RNTI value. For example, the MAC layer may indicate that the physical (PHY) layer of the UE 115-a is to choose the RACH occasion (based on an LBT pass), and the PHY layer may inform the MAC layer which RACH occasion is used for the actual RACH request 205 transmission. Additionally, or alternatively, the MAC layer may determine to control the choice of the RACH occasion, in which case the MAC layer may choose a RACH occasion and the PHY layer may notify the MAC layer if an LBT failure occurs. Following an LBT failure, the MAC layer may choose another RACH occasion and update the RA-RNTI calculations accordingly, where this process may be repeated until an LBT pass occurs. In some implementations, the UE 115-a may refrain from calculating the RA-RNTI until the LBT pass occurs. In some implementations, the MAC layer or the PHY layer may choose the next available RACH occasion sequentially in time, as opposed to choosing a random (or pseudorandom) RACH occasion. Accordingly, the UE 115-a may encounter an LBT pass in a set of LBT opportunities sooner than if the UE 115-a were to use a random or pseudorandom process for selecting a RACH occasion. The UE 115-a may support performing LBT at one or more of a set of LBT opportunities to achieve LBT diversity for the RACH request 205 transmission.

Based on transmitting the RACH request 205, the UE 115-a may begin a RAR timer. In some implementations, the UE 115-a may begin the RAR timer following one of a successful preamble transmission or a data transmission (such as msgA payload) associated with the RACH request 205. In some implementations, if the UE 115-a is enabled for full-duplex communications or is taking part in a four-step RACH procedure, the UE 115-a may begin monitoring for the RAR 210 after a successful preamble transmission. In some two-step RACH procedures, this may result in the UE 115-a monitoring for a RAR during its own data transmissions (such as a msgA payload). Additionally, or alternatively, if the UE 115-a is configured for half-duplex operation and is participating in a two-step RACH procedure, the UE 115-a may begin monitoring for the RAR after a defined amount of time following a successful preamble transmission. In some implementations, the UE 115-a may perform an LBT procedure to transmit the msgA data payload during this defined amount of time, such that the data transmission and RAR monitoring by the UE 115-a do not overlap in time. Further, the UE 115-*a* may restart monitoring for the RAR 210 or may retransmit the RACH request 205 based on the RAR timer and the length of the RAR window (for example, if the timer indicates that the length of the window is reached). In some implementations, if the UE 115-*a* is participating in a two-step RACH procedure, the UE 115-*a* may determine to fall back to a four-step RACH procedure if the length of the RAR window is reached without detecting the RAR 210.

In some implementations, the UE 115-*a* may monitor for the RAR 210 using cells or frequency sub-bands (such as multiples of 20 MHz) that do not correspond to a PCell designated for receiving the RAR 210. For example, prior to beginning the RACH procedure the UE 115-*a* may decode a system information block (SIB) or dedicated signaling (such as RRC signaling) that may indicate sub-bands or SCells to monitor for the RAR 210. Additionally, or alternatively, the UE 115-*a* may be configured to monitor specific sub-bands or SCells for the RAR 210. In some implementations, the sub-bands and SCells indicated for monitoring purposes may be associated with the base station 105-*a*. In some implementations, the sub-bands indicated to UE 115-*a* may be associated with the PCell but may be different than the sub-band designated for the RAR 210. Further, the sub-bands and SCells indicated for monitoring may be dynamically changed via PHY or MAC signaling, based on a network configuration.

In some implementations, the UE 115-*a* may employ a method for calculating RA-RNTI that is specific to unlicensed or shared spectrum. As such, the method may be based on the extended RAR window to ensure that RA-RNTI calculations return unique results for an amount of time at least as long as the extended RAR window. For example, the UE 115-*a* may use a constant range for $t_{ID}$ independent of SCS or may determine the range for $t_{ID}$ based on the length of the RAR window. If the valid range for $t_{ID}$ extends up to 80 for any SCS, the RA-RNTI calculation for the unlicensed radio frequency spectrum band may output unique RA-RNTI values for a RAR window extending up to 80 ms. In some implementations, the calculation method may be preconfigured in the UE 115-*a* or may be signaled to the UE 115-*a* via an SIB or dedicated signaling (such as RRC signaling). In some implementations, the modified RA-RNTI calculation method may employ the same set of variables used in RA-RNTI calculations for licensed spectrum.

The base station 105-*a* may receive the RACH request 205 and may calculate the RA-RNTI based on the RACH request 205 (for example, based on the RACH preamble, the PRACH occasion that the RACH request 205 is received in, etc.). The base station 105-*a* may use the same method for calculating RA-RNTI as the UE 115-*a*. The base station 105-*a* may employ an LBT procedure and may transmit the RAR 210 to the UE 115-*a* after an LBT pass. In some implementations, the RAR 210 may include a PDCCH transmission 215, a physical downlink shared channel (PDSCH) transmission 220, or both, where the PDCCH transmission 215 may include information used to process the PDSCH transmission 220. In some implementations, the base station 105-*a* may transmit timing information (indicating one or more RACH occasions) associated with the RACH request 205 to which the RAR 210 corresponds. For example, the base station 105-*a* may send the timing information in the PDCCH transmission 215 using bits in downlink control information (DCI) (such as reserved bits or information not needed to process the RAR 210), may send the timing information in the PDSCH transmission 220 in a MAC control element (CE), or may send the timing information in the PDSCH transmission 220 as a part of the payload. In some implementations, if the base station 105-*a* sends the timing information in the PDCCH transmission 215, the UE 115-*a* may be able to receive the timing information and determine that the RAR 210 is intended for the UE 115-*a* without having to successfully decode the PDSCH transmission 220.

In some implementations, the UE 115-*a* may receive the RAR 210 and may decode the timing information. Moreover, the UE 115-*a* may determine that the RAR 210 is intended for the UE 115-*a* if the timing information matches or includes the timing information associated with transmission of the RACH request 205. Accordingly, the UE 115-*a* may begin communications with base station 105-*a* using information included in the RAR 210. In some implementations, the RAR 210 may indicate for the UE 115-*a* to switch from a two-step RACH procedure to a four-step RACH procedure. For example, the UE 115-*a* may send msgA to the base station 105-*a* as a part of two-step RACH, but the base station 105-*a* may respond with msg2, indicating a switch to four-step RACH.

In some implementations, the base station 105-*a* may include the timing information in the form of a time distance (such as a number of slots or symbols) between the transmission of the RACH request 205 and the transmission of the RAR 210. Additionally, or alternatively, the timing information may include or indicate a transmission time for the RACH request 205. In some implementations, the transmission time may include a system frame number (SFN) plus a slot index corresponding to the transmission of the RACH request 205. In some implementations, the transmission time may be indicated in a number of bits (such as X bits) at the end of an SFN, where the number of bits (such as X bits) may depend on the amount of time by which the RAR window may be extended for an unlicensed or shared spectrum. Depending on the number of bits included in the timing information, the timing information may indicate a number of different PRACH occasions.

In some examples, the base station 105-*a* may use one bit to indicate whether the RACH request 205 was transmitted in an even or odd frame. In some other examples, two bits may be used to indicate the timing of the RACH request 205 for a 40-ms window (because the SFN may indicate timing according to 10-ms intervals). As such, 00 may indicate a first 10-ms frame in the 40-ms window, 01 may indicate a second 10-ms frame in the window, 10 may indicate a third 10-ms frame in the window, and 11 may indicate a fourth 10-ms frame in the window. Accordingly, even if the UE 115-*a* were to transmit a RACH request 205 at a time of 5 ms (with reference to an arbitrary start time) and a second UE 115 were to send another RACH request 205 (for the same RACH preamble) at a time of 25 ms, where the RA-RNTI calculation procedure results in a same RA-RNTI value for these RACH requests 205, the SFN for the RACH request 205 transmission time by the UE 115-*a* may have 00 as the last two digits and the SFN value for the other RACH request 205 transmission time by the second UE 115 may have 10 as the last two digits. Accordingly, two bits may differentiate between the timing of the two RACH requests 205. A UE 115 receiving a RAR 210 with timing information indicating the last two bits of the SFN may correspondingly differentiate between the RAR 210 for the two RACH requests 205 associated with the same RA-RNTI.

Figure 3:
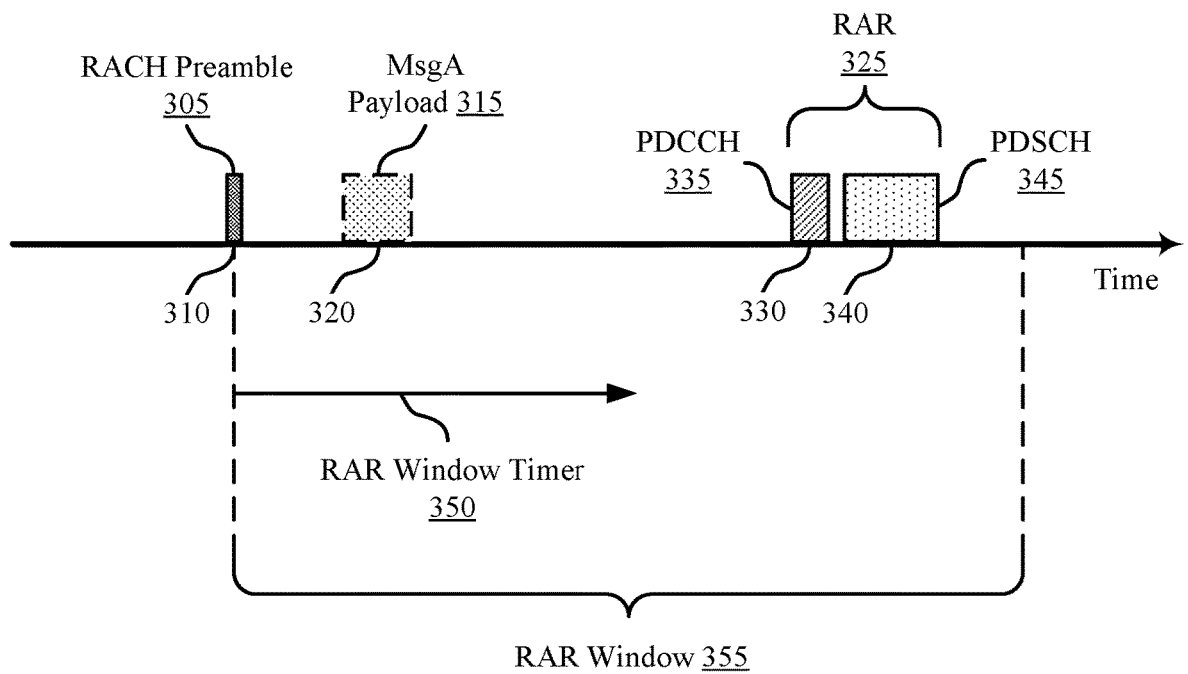
FIG. 3 shows a timeline of an example process for random access (RACH) response (RAR) reception.

FIG. 3 shows a timeline 300 of an example process for RAR reception. The timeline 300 supports RAR reception in an unlicensed radio frequency spectrum band. In some implementations, timeline 300 may implement aspects of wireless communications systems 100 or 200 and may include operations by a UE 115 and a base station 105, which may be examples of a UE 115 and a base station 105 described with reference to FIGS. 1 and 2. For example, the UE 115 may transmit a RACH preamble 305 to the base station 105 (in a selected RACH occasion) and the base station 105 may transmit a RAR 325 to the UE 115, as described with reference to FIGS. 1 and 2. Moreover, the RACH communications between the UE 115 and the base station 105 may be part of a two-step RACH procedure or a four-step RACH procedure. In some implementations, if the base station 105 and the UE 115 are preforming a two-step RACH procedure, the timeline 300 also may include transmission of a msgA payload 315 (including data) from the UE 115 to the base station 105.

In some implementations, the UE 115 may send the RACH preamble 305 to the base station 105 at a preamble transmission time 310, after completing an LBT procedure and determining an LBT pass. In some implementations, the MAC layer may receive information regarding the RACH occasion used for transmitting the RACH preamble 305, in order to correctly calculate an RA-RNTI value. In some implementations, the MAC layer may receive information regarding the RACH occasion as discussed with reference to FIG. 2.

After transmitting the RACH preamble 305, the UE 115 may begin a RAR window timer 350. Additionally, or alternatively, the UE 115 may begin the RAR window timer 350 following a data transmission (such as the msgA payload 315) at a data transmission time 320. In some implementations, the RAR window timer 350 coincides with the beginning of a RAR window 355, during which the UE 115 may monitor for the RAR 325 from the base station 105. The UE 115 may monitor for a RAR 325 that is based on (for example, scrambled using) the calculated RA-RNTI.

In some implementations (such as if the UE 115 is enabled for full-duplex communications or is participating in four-step RACH), the UE 115 may begin monitoring for the RAR 325 at or following preamble transmission time 310. Accordingly, the UE 115 may monitor during its own data transmissions (such as transmission of a msgA payload 315). Additionally, or alternatively (such as if the UE 115 is configured for half-duplex communications and is participating in two-step RACH), the UE 115 may begin monitoring a defined amount of time following preamble transmission time 310. Further, the UE 115 may retransmit the RACH preamble 305, the msgA payload 315, or both based on the RAR window timer 350 and the RAR window 355. For example, the UE 115 may determine to restart the RACH procedure if the RAR window timer 350 expires, indicating that the end of the RAR window 355 has been reached without receiving a RAR 325 in response to the RACH preamble 305. In some implementations, if the UE 115 is participating in a two-step RACH procedure, the UE 115 may fall back to a four-step RACH procedure based on the RAR window timer 350 expiring. In some other implementations, the UE 115 may retransmit msgA to restart the two-step RACH procedure.

In some implementations, the base station 105 may receive the RACH preamble 305, may employ an LBT procedure, and may transmit the RAR 325 to the UE 115 after an LBT pass. The RAR 325 may include a PDSCH portion 345 transmitted at a response transmission time 340 and containing information regarding communication resources for the UE 115. Similarly, the RAR 325 may include a PDCCH portion 335 transmitted at a PDCCH transmission time 330, where the PDCCH portion 335 may include information used to process the PDSCH portion 345. In some implementations, the base station 105 may include timing information associated with the preamble transmission time 310 within the PDCCH portion 335 or the PDSCH portion 345 in order for the UE 115 to identify the correct RACH preamble 305 corresponding to the RAR 325. For example, the base station 105 may send the timing information in the PDCCH portion 335 using DCI reserved bits (such as bits not needed to process the RAR 325), in the PDSCH portion 345 in a MAC CE, or in the PDSCH portion 345 as a part of the payload.

Accordingly, the UE 115 may receive the RAR 325 and may decode the timing information. For example, the UE 115 may unscramble the RAR 325 using the RA-RNTI calculated for the RACH preamble 305 and may use the timing information to determine if the RAR 325 is in response to the RACH preamble 305 in case the RA-RNTI is not unique to the RACH preamble 305 within the RAR window 355. In some implementations, the UE 115 may determine that the RAR 325 is intended for the UE 115 if the timing information matches or includes a time associated with transmission of the RACH preamble 305. Additionally, if the base station 105 includes the timing information in the PDCCH portion 335, the UE 115 may be able to receive the timing information (and determine that the RAR 325 is intended for the UE 115) without having to successfully decode the PDSCH portion 345.

In some implementations, the base station 105 may include the timing information in the form of a time interval (such as a number of slots or symbols) between the preamble transmission time 310 and the PDCCH transmission time 330, or between the preamble transmission time 310 and the response transmission time 340. For example, the base station 105 may include an indication of the number of slots or symbols between the preamble transmission time 310 and the PDCCH transmission time 330. Additionally, or alternatively, the timing information may include the preamble transmission time 310. In some implementations, the transmission time may include an SFN plus a slot index, corresponding to the preamble transmission time 310. In some implementations, the transmission time may be indicated in a number of bits (such as X bits) at the end of an SFN, where the number of bits (such as X bits) may depend on the amount of time by which the RAR window is extended. For example, two bits may be used to indicate time data covering an extension window of 40 ms, etc. The timing information may indicate a single PRACH occasion or a set of PRACH occasions, and the UE 115 may determine whether the PRACH occasion corresponding to the preamble transmission time 310 matches the single PRACH occasion or is included in the set of PRACH occasions. If the preamble transmission time 310 is included in the indicated single PRACH occasion or set of PRACH occasions, the UE 115 may determine that the RAR 325 containing this timing information is in response to the RACH preamble 305 transmitted at this preamble transmission time 310.

Figure 4:
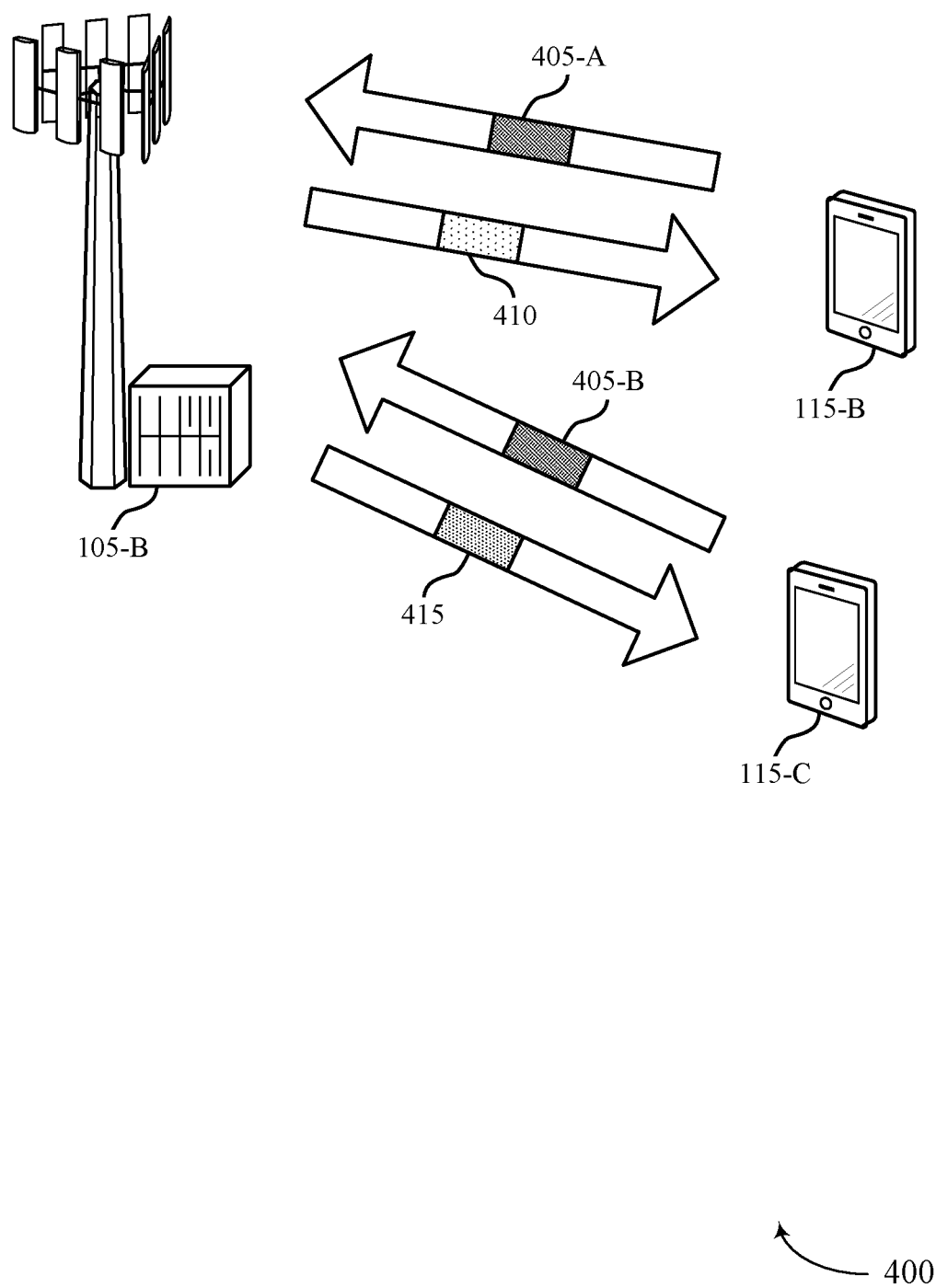
FIG. 4 shows an example wireless communications system for RAR reception.

FIG. 4 shows an example wireless communications system 400 for RAR reception. The wireless communications system 400 supports RAR reception in an unlicensed radio frequency spectrum band. In some implementations, the wireless communications system 400 may implement aspects of the wireless communications systems 100 or 200. Additionally, the wireless communications system 400 may implement aspects of the timeline 300. In some implementations, the wireless communications system 400 may include UEs 115-b and 115-c and a base station 105-b, which may be examples of UEs 115 and a base station 105 described with reference to FIGS. 1-3. For example, the UEs 115-b and 115-c may each transmit a separate RACH request 405 to the base station 105-b, and the base station 105-b may transmit a RAR corresponding to each UE 115, as described with reference to FIGS. 1-3. Moreover, the RACH communications between the UEs 115 and the base station 105 may be part of a two-step RACH procedure or a four-step RACH procedure.

In some implementations, the UEs 115-b and 115-c may calculate a same RA-RNTI value (based on an RA-RNTI calculation method) for decoding RAR messages. The UEs 115-b and 115-c may send RACH requests 405-a and 405-b, respectively, to the base station 105-b. The base station 105-b may calculate the same RA-RNTI value for both the RACH request 405-a and the RACH request 405-b based on the same RA-RNTI calculation procedure as implemented at the UEs 115-b and 115-c. In some implementations, the base station 105-b may include timing information in a RAR 410 (including within an associated PDCCH) directed to the UE 115-b indicating a time associated with the RACH request 405-a (such as a RACH occasion). Similarly, the base station 105-b may include timing information in a RAR 415 or associated PDCCH directed to the UE 115-c indicating a time associated with the RACH request 405-b. As such, the UEs 115-b and 115-c may receive and decode one or both of the RARs 410 and 415 and may identify the response directed to each UE 115 by identifying the timing information associated with the corresponding RACH request 405. Therefore, the UE 115-b may receive and decode the RAR 415 and may determine the RAR 415 is not directed to the UE 115-b based on the timing information in the RAR 415. Similarly, the UE 115-b may receive and decode the RAR 410 and may determine the RAR 410 is directed to the UE 115-b based on the timing information in the RAR 410.

Figure 5:
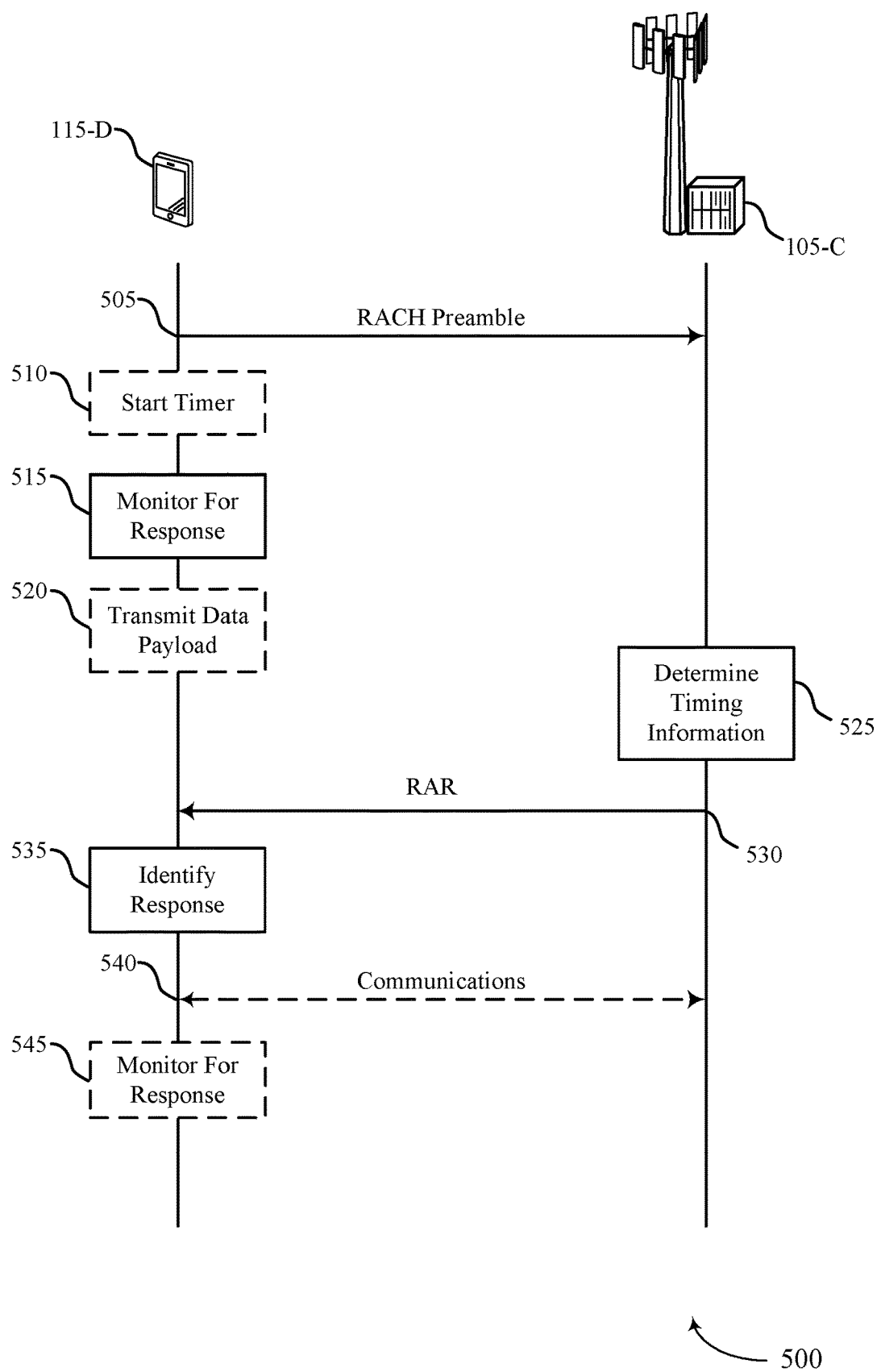
FIGS. 5 and 6 show example process flows for RAR reception.

FIG. 5 shows an example process flow 500 for RAR reception. The process flow 500 supports RAR reception in an unlicensed radio frequency spectrum band. In some implementations, the process flow 500 may implement aspects of the wireless communications systems 100, 200, or 400. Additionally, the process flow 500 may implement aspects of the timeline 300. Further, the process flow 500 may be implemented by a UE 115-d and a base station 105-c, which may be examples of a UE 115 and a base station 105 described with reference to FIGS. 1-4. For example, the UE 115-d may determine to transmit a RACH preamble in either a licensed radio frequency spectrum band or an unlicensed radio frequency spectrum band, as discussed with reference to FIGS. 1-4.

In the following description of the process flow 500, the operations between the UE 115-d and the base station 105-c may be transmitted in a different order than the order shown, or the operations performed by the base station 105-c and the UE 115-d may be performed in different orders or at different times. Certain operations also may be left out of the process flow 500, or other operations may be added to the process flow 500. It is to be understood that while the base station 105-c and the UE 115-d are shown performing a number of the operations of the process flow 500, any wireless device may perform the operations shown.

At 505, the UE 115-d may transmit, to the base station 105-c, a RACH preamble associated with an RA-RNTI, in a first PRACH occasion. In some implementations, the UE 115-d may identify a set of PRACH occasions for transmitting the RACH preamble. Additionally, the UE 115-d may select the first PRACH occasion from the set of PRACH occasions for transmitting the RACH preamble, where the first PRACH occasion may be the earliest available PRACH occasion of the set of PRACH occasions. Additionally, the UE 115-d may calculate the RA-RNTI based on the selected first PRACH occasion.

In some implementations, the RACH preamble may correspond to a RACH msg1 in a four-step RACH procedure or a RACH msgA in a two-step RACH procedure.

At 510, the UE 115-d may start a RAR window timer for a RAR window after transmitting the RACH preamble.

At 515, the UE 115-d may monitor for a RAR message within the RAR window. In some implementations, the UE 115-d may monitor for the RAR message on a PCell and at least one of one or more SCells and one or more sub-bands. In some implementations, the UE 115-d may determine to monitor for the RAR message on the at least one of the one or more SCells and the one or more sub-bands based on at least one of received system information, received dedicated signaling, and a configuration of the UE 115-d.

At 520, the UE 115-d may transmit a data payload transmission associated with the RACH preamble, where the monitoring for the RAR message within the RAR window may overlap in time with the transmitting the data payload transmission (for example, if the UE 115-d operates according to a full-duplex configuration). Alternatively, the UE 115-d may transmit the data payload transmission an amount of time after transmitting the RACH preamble such that the monitoring for the RAR message within the RAR window is non-overlapping in time with the transmitting the data payload transmission (for example, if the UE 115-d operates according to a half-duplex configuration). In some other implementations, the UE 115-d may start the RAR window an amount of time after transmitting the RACH preamble such that the monitoring for the RAR message within the RAR window is non-overlapping in time with the transmitting the data payload transmission (for example, if the UE 115-d operates according to a half-duplex configuration).

At 525, the base station 105-c may determine timing information corresponding to the received RACH preamble, where the timing information may indicate a set of PRACH occasions. In some implementations, the timing information may include a difference in time between a first time corresponding to the first PRACH occasion and a second time at which a RAR message is transmitted by the base station 105-c. Additionally, or alternatively, the timing information may include at least a portion of an SFN corresponding to the first PRACH occasion.

In some implementations, the base station 105-c may receive, from an additional UE 115, an additional RACH preamble associated with the RA-RNTI in an additional PRACH occasion different from the PRACH occasion. As such, the base station 105-c may determine additional timing information corresponding to receiving the additional RACH preamble, where the additional timing information may indicate an additional set of PRACH occasions including the additional PRACH occasion.

At 530, the base station 105-c may transmit, to the UE 115-d and in response to the RACH preamble, a RAR message within the RAR window, where the RAR message may include the RA-RNTI and the timing information indicating the set of PRACH occasions. In some implementations, the UE 115-d may receive the RAR based on the monitoring. In some implementations, the base station 105-c may transmit the timing information in at least one of DCI, a MAC CE, or a PDSCH payload. In some implementations, the RAR message may correspond to a RACH msg2 in a four-step RACH procedure or a RACH msgB in a two-step RACH procedure.

Additionally, the base station 105-*c* may transmit the RAR message on at least one of a PCell, an SCell, and a sub-band. In some implementations, the base station 105-*c* may determine the at least one of the PCell, the SCell, and the sub-band based on at least one of the transmitted system information, the transmitted dedicated signaling for the UE 115-*d*, and the configuration of the UE 115-*d*.

In some implementations, the base station 105-*c* may transmit to the additional UE 115, and in response to the additional RACH preamble, an additional RAR message within the RAR window. In some implementations, the additional RAR message may include the RA-RNTI and the additional timing information indicating the additional set of PRACH occasions.

At 535, the UE 115-*d* may identify whether the RAR message is in response to the RACH preamble based on determining whether the set of PRACH occasions includes the first PRACH occasion. In some implementations, the UE 115-*d* may identify that the RAR message is in response to the RACH preamble based on determining that the set of PRACH occasions includes the first PRACH occasion. In some other implementations, the UE 115-*d* may identify that the RAR message is in response to a different RACH preamble (different from the RACH preamble transmitted at 505) based on determining that the set of PRACH occasions does not include the first PRACH occasion.

In some implementations, at 540, the UE 115-*d* and the base station 105-*c* may communicate using information received by the UE 115-*d* in the RAR message, based on identifying that the RAR message is in response to the RACH preamble.

In some other implementations, at 545, the UE 115-*d* may monitor for an additional RAR message within the RAR window that is in response to the RACH preamble based on identifying that the RAR message received at 530 is in response to an additional RACH preamble different from the RACH preamble transmitted at 505. Additionally, or alternatively, the UE 115-*d* may operate according to a two-step RACH procedure and may determine that a RAR message in response to the RACH preamble is not received within the RAR window based on the monitoring. As such, the UE 115-*d* may switch to operate according to a four-step RACH procedure based on determining that the RAR message is not received.

Figure 6:
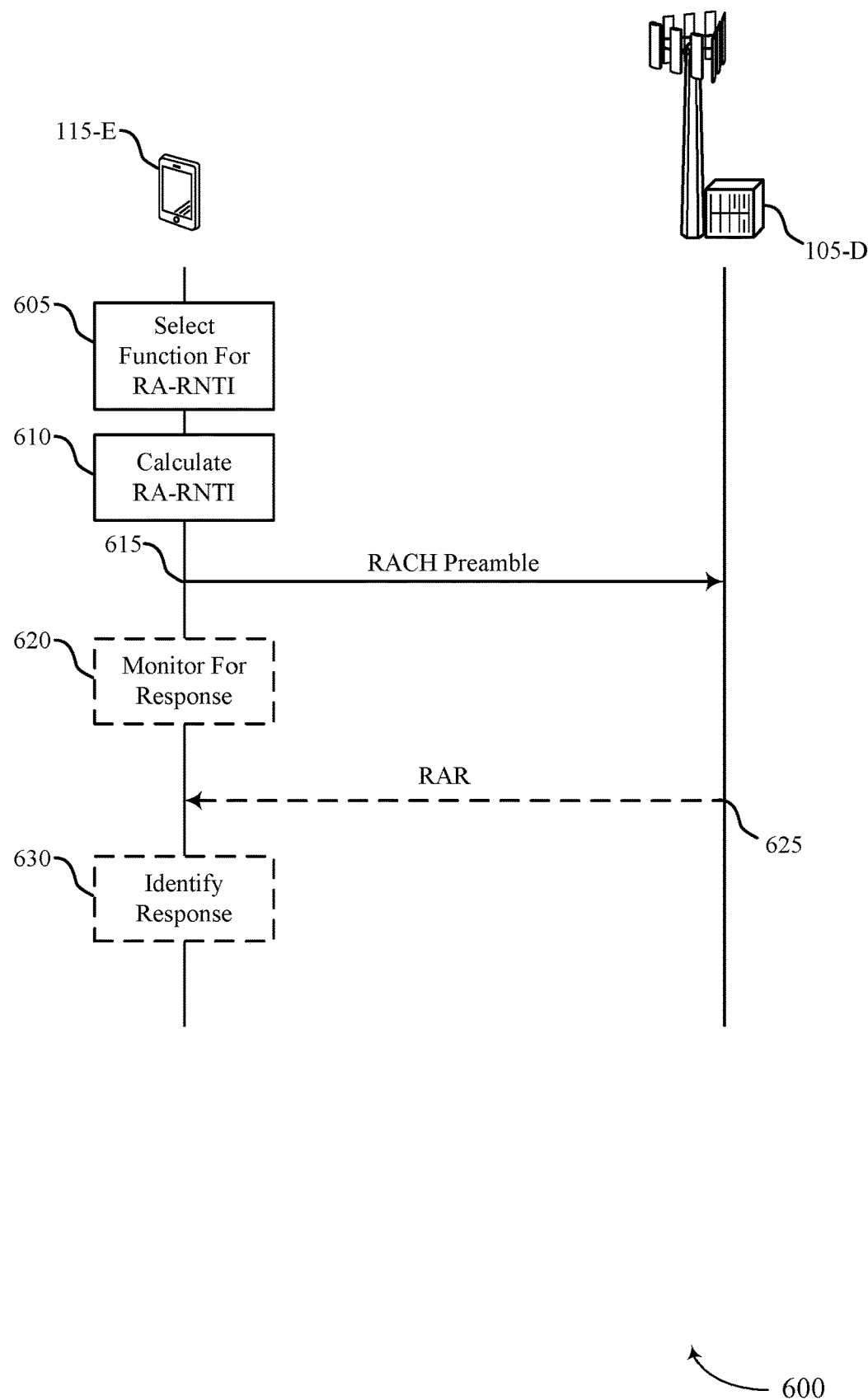

FIG. 6 shows an example process flow 600 for RAR reception. The process flow 600 supports RAR reception in an unlicensed radio frequency spectrum band. In some implementations, the process flow 600 may implement aspects of the wireless communications systems 100, 200, or 400. Additionally, the process flow 600 may implement aspects of the timeline 300. Further, the process flow 600 may be implemented by a UE 115-*e* and a base station 105-*d*, which may be examples of a UE 115 and a base station 105 described with reference to FIGS. 1-5. For example, the UE 115-*e* may determine to transmit a RACH preamble in either a licensed radio frequency spectrum band or an unlicensed radio frequency spectrum band, as discussed with reference to FIGS. 1-5.

In the following description of the process flow 600, the operations between the UE 115-*e* and the base station 105-*d* may be transmitted in a different order than the order shown, or the operations performed by the base station 105-*d* and the UE 115-*e* may be performed in different orders or at different times. Certain operations also may be left out of the process flow 600, or other operations may be added to the process flow 600. It is to be understood that while the base station 105-*d* and the UE 115-*e* are shown performing a number of the operations of the process flow 600, any wireless device may perform the operations shown.

At 605, the UE 115-*e* may select a function for calculating an RA-RNTI, where the function may be selected from a set of functions based on whether the RACH preamble is determined to be transmitted in the licensed radio frequency spectrum band or the unlicensed radio frequency spectrum band. For example, the functions may be different according to different constants used in the functions, different variables used in the functions, different valid ranges for variables used in the functions, different operations performed in the functions, or some combination of these or other differences between the functions.

At 610, the UE 115-*e* may calculate the RA-RNTI using the selected function and based on a PRACH occasion. In some implementations, the RACH preamble may be determined to be transmitted in the unlicensed radio frequency spectrum band and the selected function for calculating the RA-RNTI may output a different value for each PRACH occasion within a RAR window for the unlicensed radio frequency spectrum band. In some implementations, the RAR window for the unlicensed radio frequency spectrum band may span an amount of time greater than a RAR window for the licensed radio frequency spectrum band. Additionally, the UE 115-*e* may calculate the RA-RNTI based on at least one of a first OFDM symbol of the PRACH occasion, a first slot of the PRACH occasion in a system frame, a frequency domain index of the PRACH occasion, and an uplink carrier identifier for transmitting the RACH preamble.

At 615, the UE 115-*e* may transmit the RACH preamble associated with the calculated RA-RNTI in the PRACH occasion. In some implementations, the UE 115-*e* may identify a set of PRACH occasions for transmitting the RACH preamble (for LBT diversity) and may select the PRACH occasion from the set of PRACH occasions for transmitting the RACH preamble. In some implementations, the PRACH occasion may be an earliest available PRACH occasion of the set of PRACH occasions.

At 620, the UE 115-*e* may monitor, within a RAR window, for a RAR message in response to the RACH preamble. In some implementations, UE 115-*e* may monitor for the RAR message on a PCell and at least one of one or more SCells and one or more sub-bands. Additionally, the UE 115-*e* may determine to monitor for the RAR message on the at least one of the one or more SCells and the one or more sub-bands based on at least one of received system information, received dedicated signaling, and a configuration of the UE 115-*e*.

At 625, the base station 105-*d* may transmit, to the UE 115-*e*, a RAR message within the RAR window, where the RAR message may include the RA-RNTI. At 630, the UE 115-*e* may identify that the RAR message is in response to the RACH preamble based on the RA-RNTI received in the RAR message.

Figure 7:
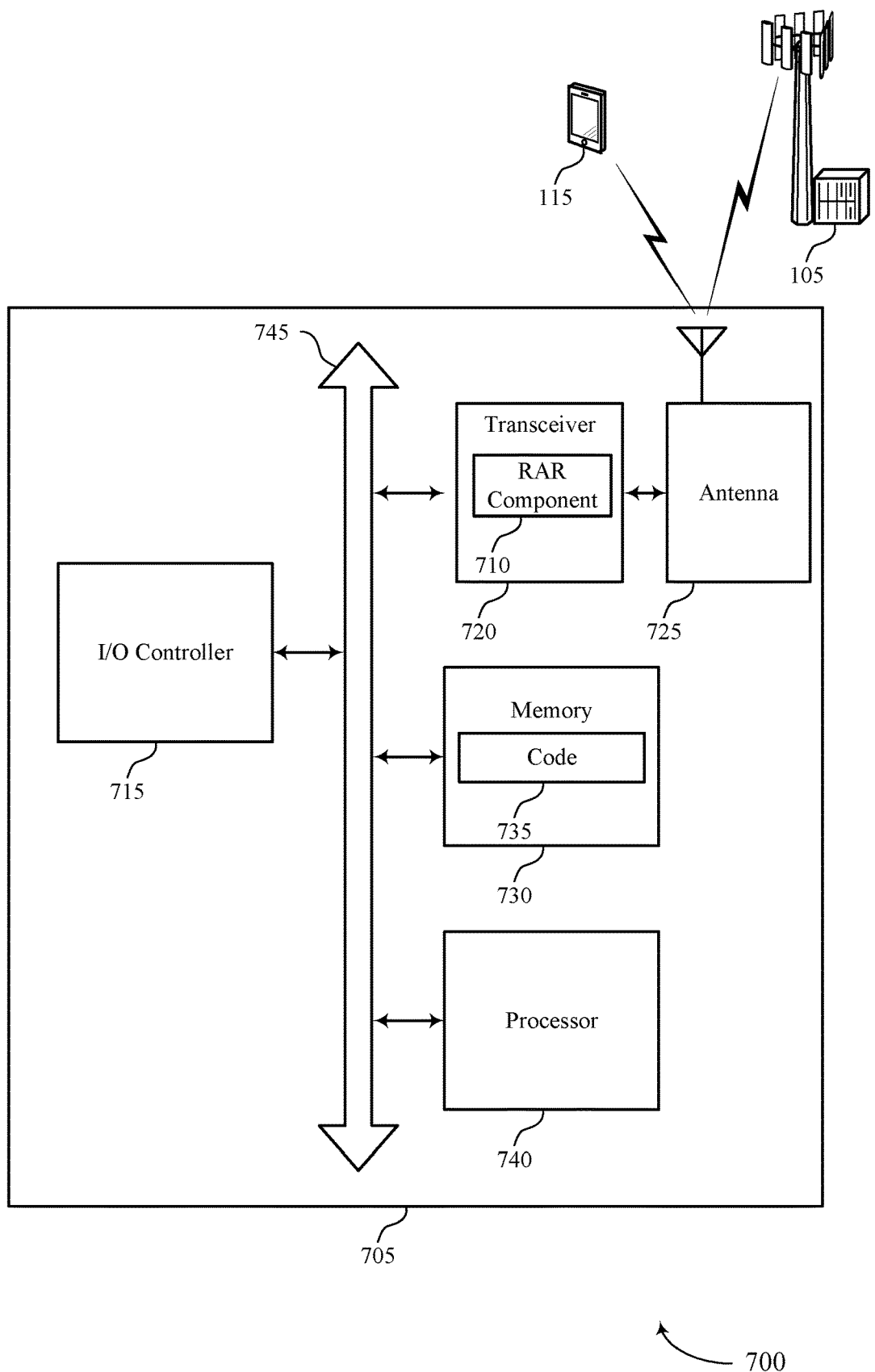
FIGS. 7 and 8 show example diagrams of systems for RAR reception.

FIG. 7 shows an example diagram of a system 700 for RAR reception. The system 700 includes a device 705 that supports RAR reception in an unlicensed radio frequency spectrum band. The device 705 may be an example of a UE 115 as described herein. The device 705 may include components for bi-directional voice and data communications including components for transmitting and receiving communications, including a RAR component 710, an input/output (I/O) controller 715, a transceiver 720, an antenna 725, memory 730, and a processor 740. These components may be in electronic communication via one or more buses (such as bus 745).

In some implementations, the RAR component 710 may transmit a RACH preamble associated with an RA-RNTI in a first PRACH occasion, receive, from a base station, a RAR message within a RAR window, where the RAR message includes the RA-RNTI and timing information indicating a set of PRACH occasions, determine whether the set of PRACH occasions includes the first PRACH occasion, and identify whether the RAR message is in response to the RACH preamble based on the determining. In some implementations, the RAR component 710 may determine to transmit a RACH preamble in either a licensed radio frequency spectrum band or an unlicensed radio frequency spectrum band, select a function for calculating an RA-RNTI, where the function is selected from a set of functions based on whether the RACH preamble is determined to be transmitted in the licensed radio frequency spectrum band or the unlicensed radio frequency spectrum band, calculate the RA-RNTI using the selected function and based on a PRACH occasion, and transmit the RACH preamble associated with the calculated RA-RNTI in the PRACH occasion.

The I/O controller 715 may manage input and output signals for the device 705. The I/O controller 715 also may manage peripherals not integrated into the device 705. In some implementations, the I/O controller 715 may represent a physical connection or port to an external peripheral.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas.

In some implementations, the wireless device may include a single antenna 725. However, in some implementations the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein.

The processor 740 may include an intelligent hardware device (such as a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). The processor 740 may be configured to execute computer-readable instructions stored in a memory (such as the memory 730) to cause the device 705 to perform various functions (such as functions or tasks supporting RAR reception in an unlicensed radio frequency spectrum band).

The code 735 may include instructions to implement aspects of the present disclosure, including instructions to support wireless communications. In some implementations, the code 735 may not be directly executable by the processor 740 but may cause a computer (such as when compiled and executed) to perform functions described herein.

Additionally, or alternatively, the device 705 may include one or more interfaces and a processing system. The processing system may be in electronic communication with the one or more interfaces. In some implementations, the interfaces and processing system may be components of a chip or modem, which may be a component of the device 705. The processing system and one or more interfaces may include aspects of the RAR component 710, the memory 730, the processor 740, or a combination thereof. The processing system and one or more interfaces also may be in electronic communication with the I/O controller 715, the transceiver 720, or both (such as via the bus 745).

For example, a first interface may be configured to output information to other components of the device 705. A second interface may be configured to obtain information from other components of the device 705. The information may be sent and received in the form of encoded or unencoded bits. The processing system may perform any number of processes to modify or determine the information output from the first interface.

In some implementations, the first interface may be configured to output a RACH preamble associated with an RA-RNTI for transmission in a first PRACH occasion. The first interface may output the RACH preamble to the transceiver 720, and the transceiver 720 may transmit the RACH preamble in the first PRACH occasion based on the output information from the first interface and using an antenna 725. The second interface may be configured to obtain a RAR message within a RAR window, where the RAR message includes the RA-RNTI and timing information indicating a set of PRACH occasions. For example, the transceiver 720 may receive the RAR message from a base station using the antenna 720, and the second interface may obtain the received RAR message from the transceiver 720. The processing system may determine whether the set of PRACH occasions includes the first PRACH occasion and may identify whether the RAR message is in response to the RACH preamble based on this determination. The processing system may perform one or more of these processes based on the obtained information for the RAR message. Additionally, or alternatively, the processing system may determine a monitoring window corresponding to the RAR window, and the first interface may output monitoring instructions to the transceiver 720. The transceiver 720 may monitor one or more channels using one or more antennas 725 according to the monitoring instructions, and the second interface may obtain monitoring information from the transceiver 720 for processing by the processing system.

In some other implementations, the processing system may determine to transmit a RACH preamble in either a licensed or unlicensed radio frequency spectrum band. The processing system may select a function for calculating an RA-RNTI from a set of functions based on whether the RACH preamble is to be transmitted in the licensed or unlicensed band. For example, the processing system may select a slot time index range, based on a slot time index identifier, for the function such that the RA-RNTI calculated by the function is unique within a RAR window for the determined radio frequency spectrum band. The processing system may calculate the RA-RNTI using the selected function and based on a PRACH occasion, and a first interface may be configured to output the RACH preamble associated with the calculated RA-RNTI for transmission in the PRACH occasion. The transceiver 720 may receive the RACH preamble and may transmit the RACH preamble in the PRACH occasion using an antenna 725.

Figure 8:
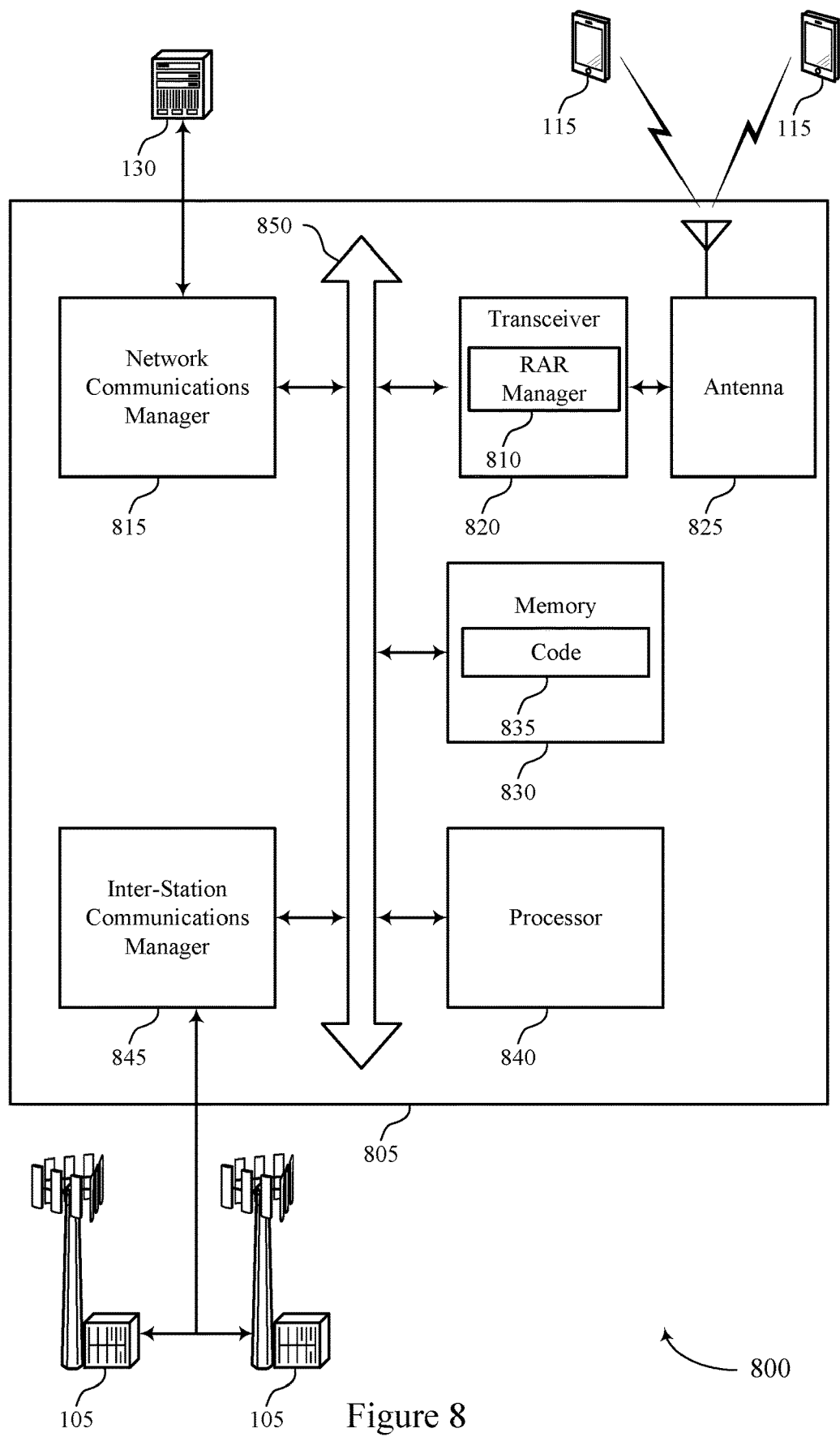

FIG. 8 shows an example diagram of a system 800 for RAR reception. The system 800 includes a device 805 that supports RAR reception in an unlicensed radio frequency spectrum band. The device 805 may be an example of a base station 105 as described herein. The device 805 may include components for bi-directional voice and data communications including components for transmitting and receiving communications, including a RAR manager 810, a network communications manager 815, a transceiver 820, an antenna 825, memory 830, a processor 840, and an inter-station communications manager 845. These components may be in electronic communication via one or more buses (such as bus 850).

The RAR manager 810 may receive, from a UE, a RACH preamble associated with an RA-RNTI in a PRACH occasion, determine timing information corresponding to receiving the RACH preamble, where the timing information indicates a set of PRACH occasions including the PRACH occasion, and transmit, to the UE and in response to the RACH preamble, a RAR message within a RAR window, where the RAR message includes the RA-RNTI and the timing information indicating the set of PRACH occasions.

The network communications manager 815 may manage communications with the core network 130 (such as via one or more wired backhaul links). For example, the network communications manager 815 may manage the transfer of data communications for client devices, such as one or more UEs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 also may include a modem to modulate the packets and provide the modulated packets to the antennas for transmission, and to demodulate packets received from the antennas.

In some implementations, the wireless device may include a single antenna 825. However, in some implementations the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (such as the processor 840) cause the device to perform various functions described herein.

The processor 840 may include an intelligent hardware device (such as a general-purpose processor, a DSP, a CPU, a microcontroller, an ASIC, an FPGA, a programmable logic device, a discrete gate or transistor logic component, a discrete hardware component, or any combination thereof). The processor 840 may be configured to execute computer-readable instructions stored in a memory (such as the memory 830) to cause the device 805 to perform various functions (such as functions or tasks supporting RAR reception in an unlicensed radio frequency spectrum band).

The inter-station communications manager 845 may manage communications with other base station 105 and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some implementations, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. In some implementations, the code 835 may not be directly executable by the processor 840 but may cause a computer (such as when compiled and executed) to perform functions described herein.

Additionally, or alternatively, the device 805 may include one or more interfaces and a processing system. The processing system may be in electronic communication with the one or more interfaces. In some implementations, the interfaces and processing system may be components of a chip or modem, which may be a component of the device 805. The processing system and one or more interfaces may include aspects of the RAR manager 810, the memory 830, the processor 840, or a combination thereof. The processing system and one or more interfaces also may be in electronic communication with the network communications manager 815, the inter-station communications manager 845, the transceiver 820, or a combination thereof (such as via the bus 850).

For example, a first interface may be configured to obtain information from other components of the device 805. A second interface may be configured to output information to other components of the device 805. The information may be sent and received in the form of encoded or unencoded bits. The processing system may perform any number of processes to modify or determine the information output from the first interface.

In some implementations, a first interface may be configured to obtain a RACH preamble associated with an RA-RNTI. For example, the transceiver 820 may receive the RACH preamble from a UE 115 using an antenna 825 in a PRACH occasion, and the first interface may receive the RACH preamble from the transceiver 820. A processing system may determine timing information corresponding to the transceiver receiving the RACH preamble, the processing system obtaining the RACH preamble, or both. The timing information may indicate a set of PRACH occasions including the PRACH occasion. A second interface may be configured to output, in response to the RACH preamble, a RAR message for transmission within a RAR window, where the RAR message includes the RA-RNTI and the timing information. The second interface may output the RAR message to the transceiver 820, and the transceiver 820 may transmit the RAR message to a UE 115 within the RAR window using an antenna 825.

Figure 9:
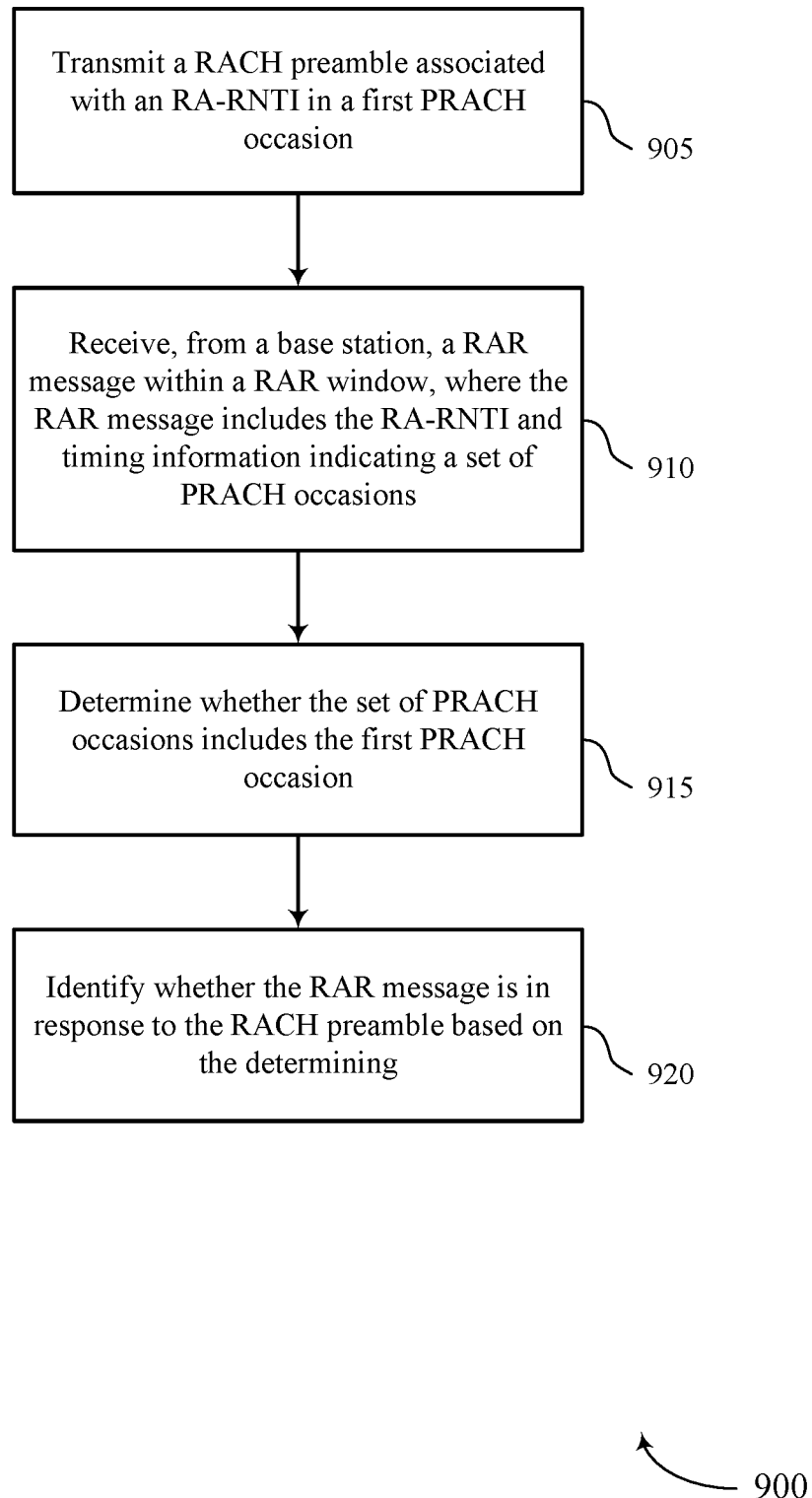
FIGS. 9-14 show flowcharts illustrating example methods that support random access response reception.

FIG. 9 shows a flowchart illustrating an example method 900 that supports RAR reception. The operations of method 900 may be implemented by a UE 115 or its components as described herein. For example, the operations of method 900 may be performed by a RAR component as described with reference to FIG. 7. In some implementations, a UE may execute a set of instructions to control the functional elements of the UE to perform the functions described below. Additionally, or alternatively, a UE may perform aspects of the functions described below using special-purpose hardware.

At 905, the UE may transmit a RACH preamble associated with an RA-RNTI in a first PRACH occasion. The operations of 905 may be performed according to the methods described herein.

At 910, the UE may receive, from a base station, a RAR message within a RAR window, where the RAR message includes the RA-RNTI and timing information indicating a set of PRACH occasions. The operations of 910 may be performed according to the methods described herein.

At 915, the UE may determine whether the set of PRACH occasions includes the first PRACH occasion. The operations of 915 may be performed according to the methods described herein.

At 920, the UE may identify whether the RAR message is in response to the RACH preamble based on the determining. The operations of 920 may be performed according to the methods described herein.

Figure 10:
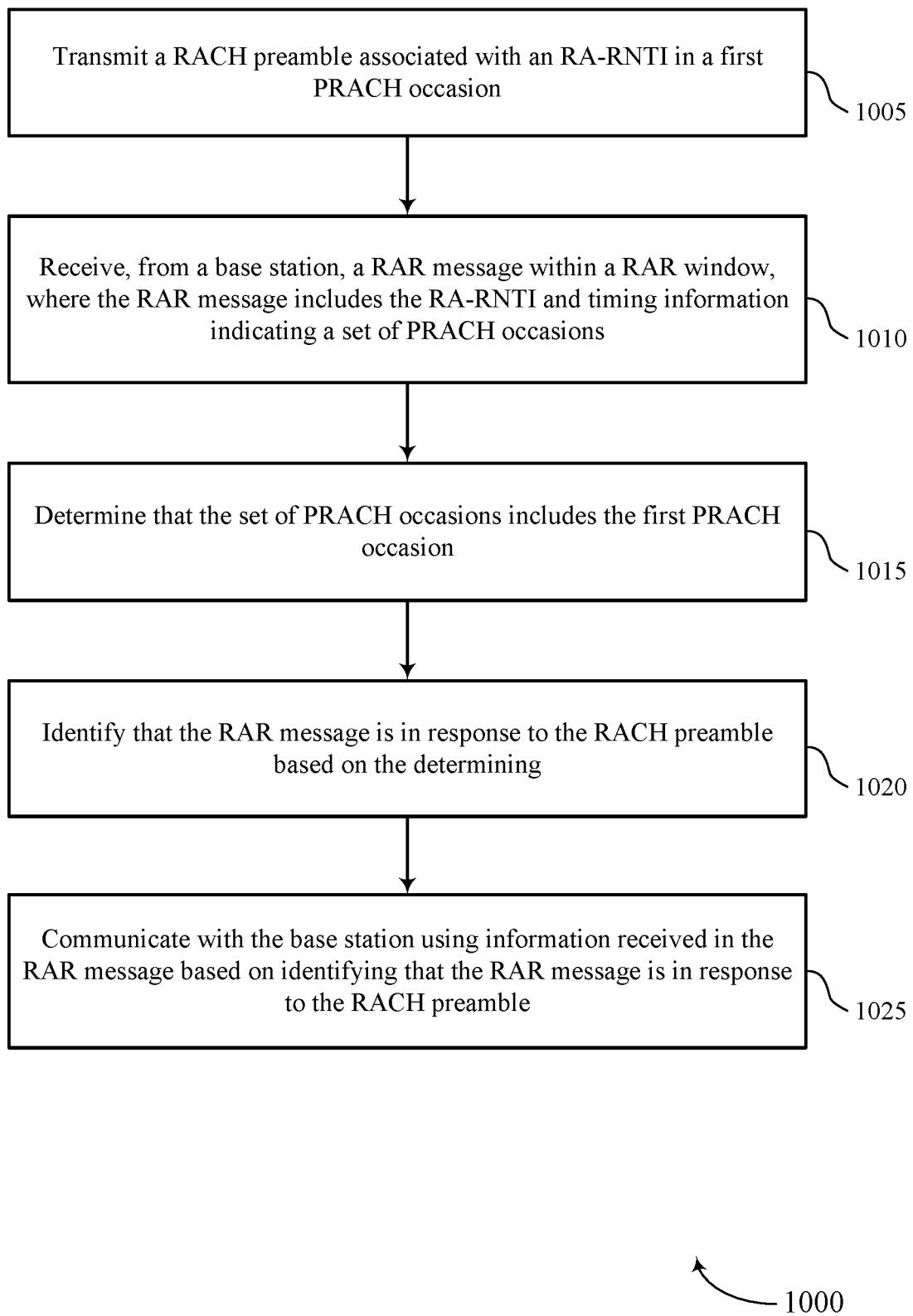

FIG. 10 shows a flowchart illustrating an example method 1000 that supports RAR reception. The operations of method 1000 may be implemented by a UE 115 or its components as described herein. For example, the operations of method 1000 may be performed by a RAR component as described with reference to FIG. 7. In some implementations, a UE may execute a set of instructions to control the functional elements of the UE to perform the functions described below. Additionally, or alternatively, a UE may perform aspects of the functions described below using special-purpose hardware.

At 1005, the UE may transmit a RACH preamble associated with an RA-RNTI in a first PRACH occasion. The operations of 1005 may be performed according to the methods described herein.

At 1010, the UE may receive, from a base station, a RAR message within a RAR window, where the RAR message includes the RA-RNTI and timing information indicating a set of PRACH occasions. The operations of 1010 may be performed according to the methods described herein.

At 1015, the UE may determine whether the set of PRACH occasions include the first PRACH occasion, where the determining may involve determining that the first PRACH occasion is included in the set of PRACH occasions. The operations of 1015 may be performed according to the methods described herein.

At 1020, the UE may identify whether the RAR message is in response to the RACH preamble based on the determining, where the identifying involves identifying that the RAR message is in response to the RACH preamble based on the determining. The operations of 1020 may be performed according to the methods described herein.

At 1025, the UE may communicate with the base station using information received in the RAR message based on identifying that the RAR message is in response to the RACH preamble. The operations of 1025 may be performed according to the methods described herein.

Figure 11:
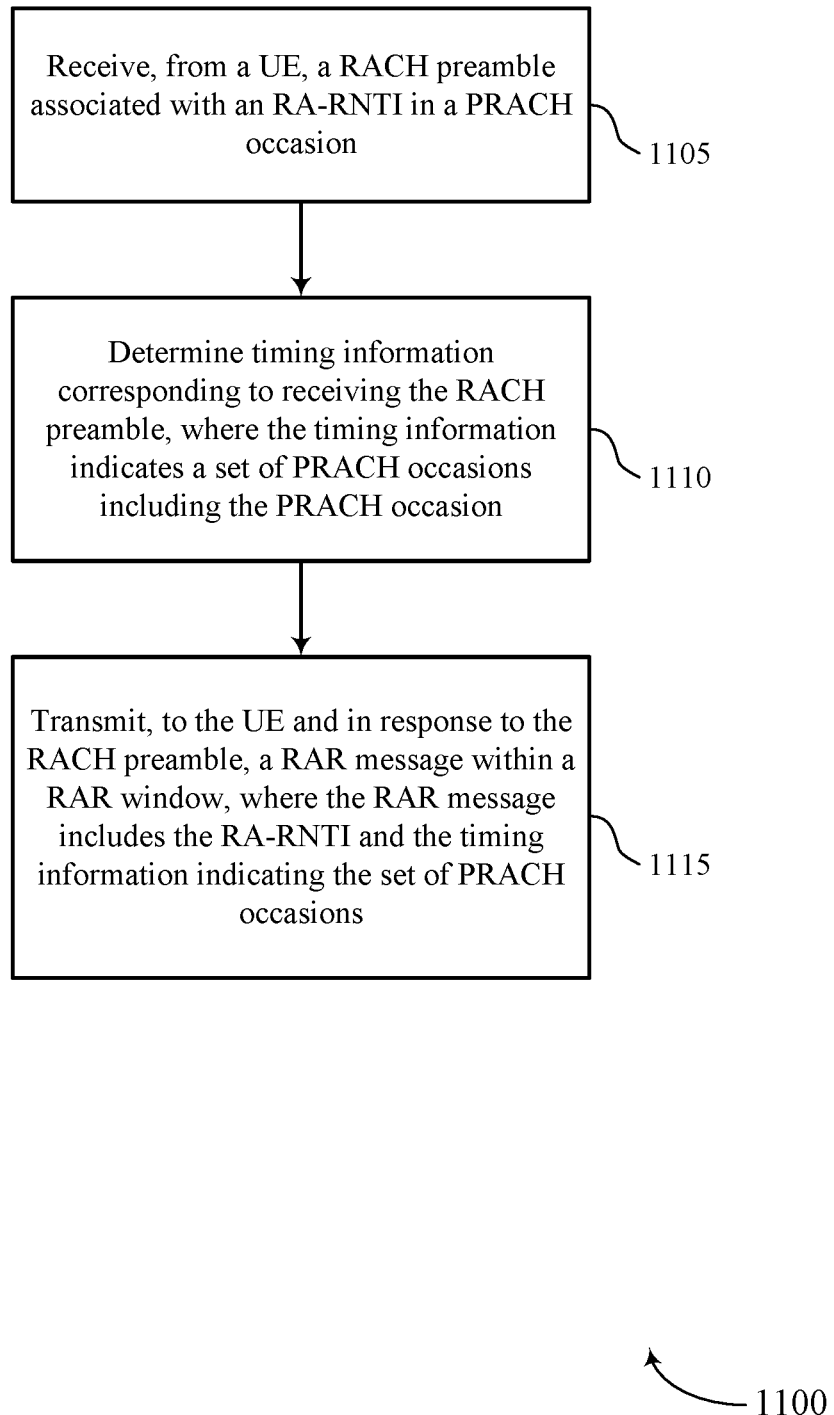

FIG. 11 shows a flowchart illustrating an example method 1100 that supports RAR reception. The operations of method 1100 may be implemented by a base station 105 or its components as described herein. For example, the operations of method 1100 may be performed by a RAR manager as described with reference to FIG. 8. In some implementations, a base station may execute a set of instructions to control the functional elements of the base station to perform the functions described below. Additionally, or alternatively, a base station may perform aspects of the functions described below using special-purpose hardware.

At 1105, the base station may receive, from a UE, a RACH preamble associated with an RA-RNTI in a PRACH occasion. The operations of 1105 may be performed according to the methods described herein.

At 1110, the base station may determine timing information corresponding to receiving the RACH preamble, where the timing information indicates a set of PRACH occasions including the PRACH occasion. The operations of 1110 may be performed according to the methods described herein.

At 1115, the base station may transmit, to the UE and in response to the RACH preamble, a RAR message within a RAR window, where the RAR message includes the RA-RNTI and the timing information indicating the set of PRACH occasions. The operations of 1115 may be performed according to the methods described herein.

Figure 12:
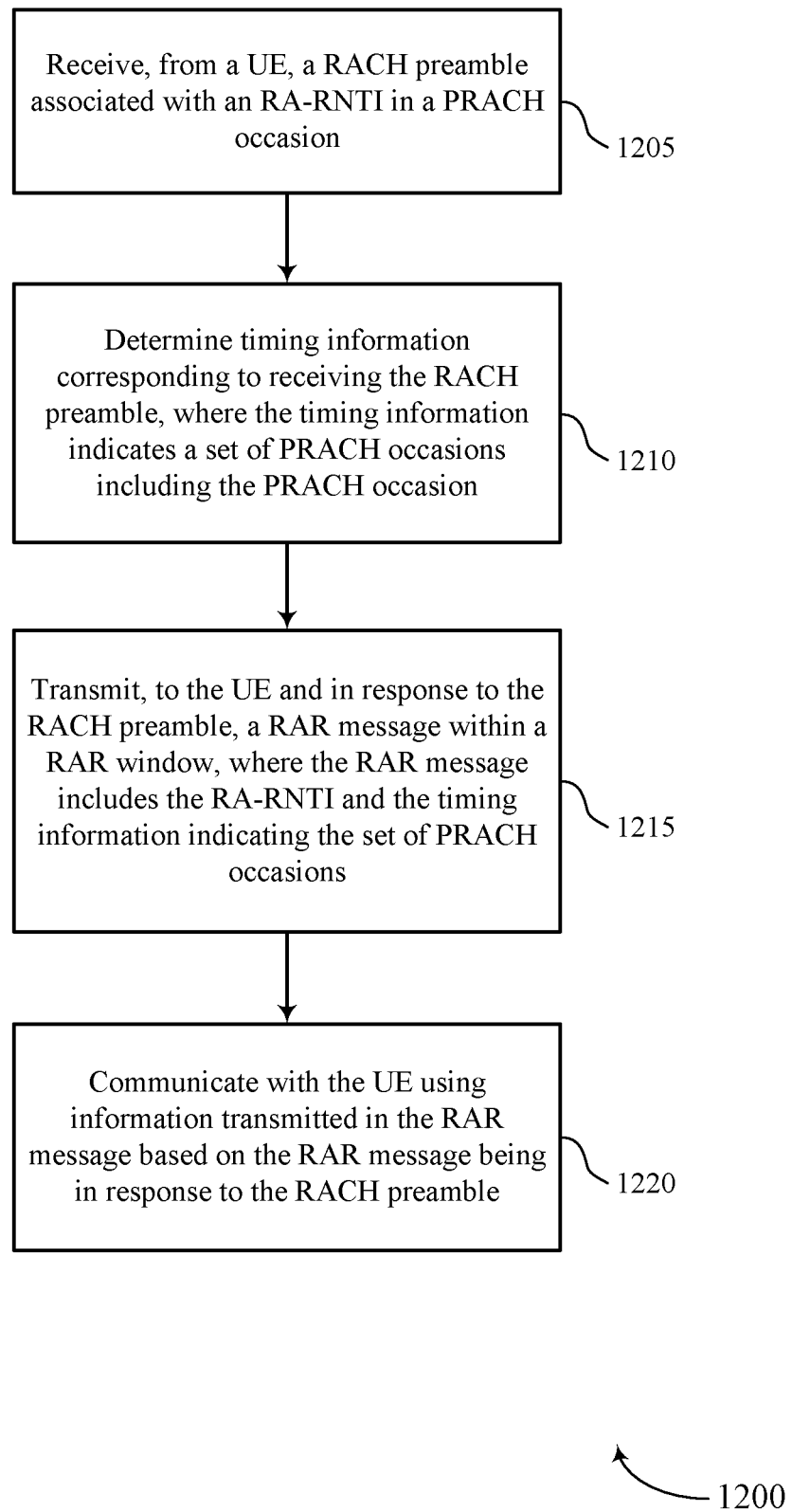

FIG. 12 shows a flowchart illustrating an example method 1200 that supports RAR reception. The operations of method 1200 may be implemented by a base station 105 or its components as described herein. For example, the operations of method 1200 may be performed by a RAR manager as described with reference to FIG. 8. In some implementations, a base station may execute a set of instructions to control the functional elements of the base station to perform the functions described below. Additionally, or alternatively, a base station may perform aspects of the functions described below using special-purpose hardware.

At 1205, the base station may receive, from a UE, a RACH preamble associated with an RA-RNTI in a PRACH occasion. The operations of 1205 may be performed according to the methods described herein.

At 1210, the base station may determine timing information corresponding to receiving the RACH preamble, where the timing information indicates a set of PRACH occasions including the PRACH occasion. The operations of 1210 may be performed according to the methods described herein.

At 1215, the base station may transmit, to the UE and in response to the RACH preamble, a RAR message within a RAR window, where the RAR message includes the RA-RNTI and the timing information indicating the set of PRACH occasions. The operations of 1215 may be performed according to the methods described herein.

At 1220, the base station may communicate with the UE using information transmitted in the RAR message based on the RAR message being in response to the RACH preamble. The operations of 1220 may be performed according to the methods described herein.

Figure 13:
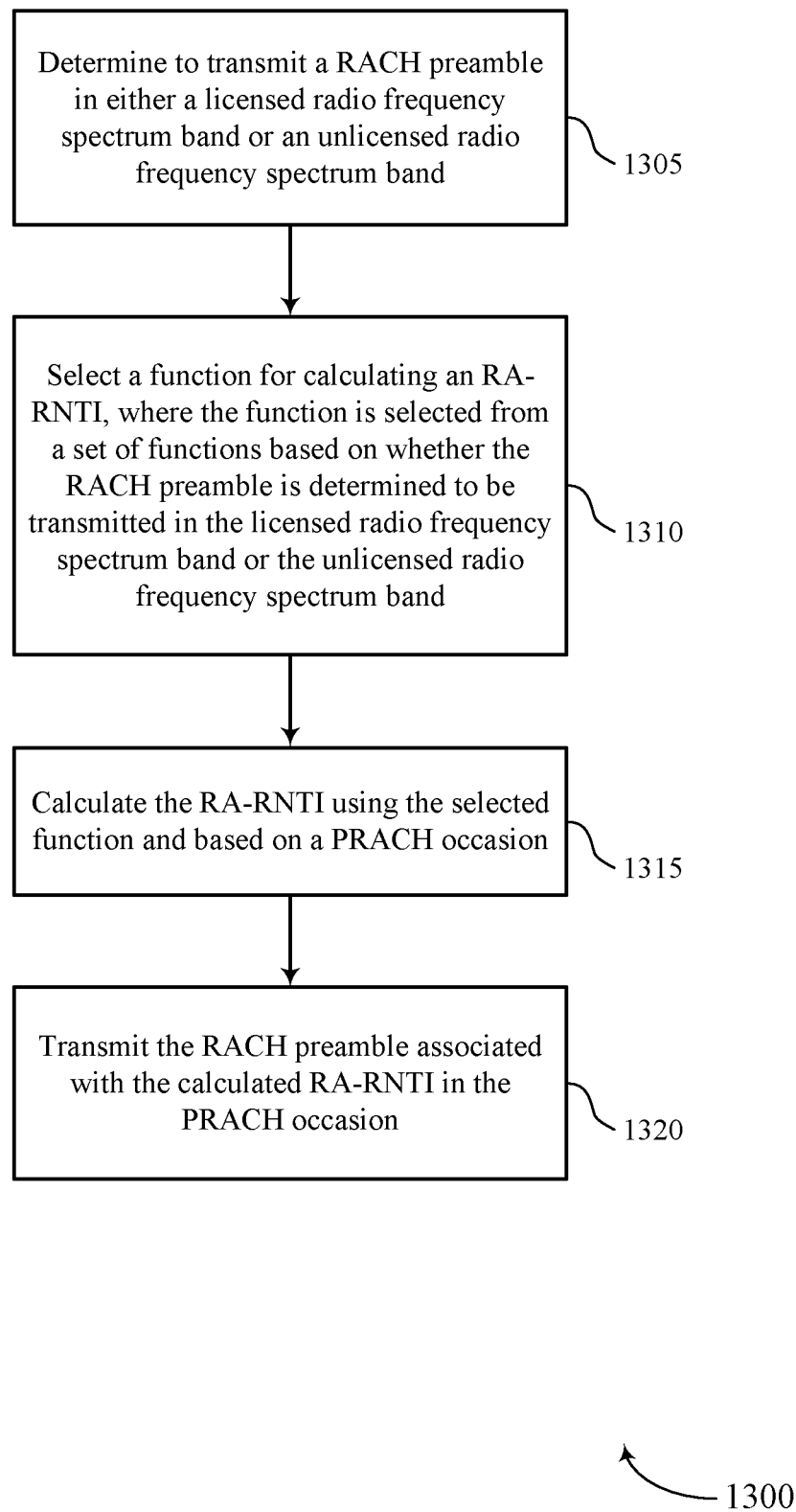

FIG. 13 shows a flowchart illustrating an example method 1300 that supports RAR reception. The operations of method 1300 may be implemented by a UE 115 or its components as described herein. For example, the operations of method 1300 may be performed by a RAR component as described with reference to FIG. 7. In some implementations, a UE may execute a set of instructions to control the functional elements of the UE to perform the functions described below. Additionally, or alternatively, a UE may perform aspects of the functions described below using special-purpose hardware.

At 1305, the UE may determine to transmit a RACH preamble in either a licensed radio frequency spectrum band or an unlicensed radio frequency spectrum band. The operations of 1305 may be performed according to the methods described herein.

At 1310, the UE may select a function for calculating an RA-RNTI, where the function is selected from a set of functions based on whether the RACH preamble is determined to be transmitted in the licensed radio frequency spectrum band or the unlicensed radio frequency spectrum band. The operations of 1310 may be performed according to the methods described herein.

At 1315, the UE may calculate the RA-RNTI using the selected function and based on a PRACH occasion. The operations of 1315 may be performed according to the methods described herein.

At 1320, the UE may transmit the RACH preamble associated with the calculated RA-RNTI in the PRACH occasion. The operations of 1320 may be performed according to the methods described herein.

Figure 14:
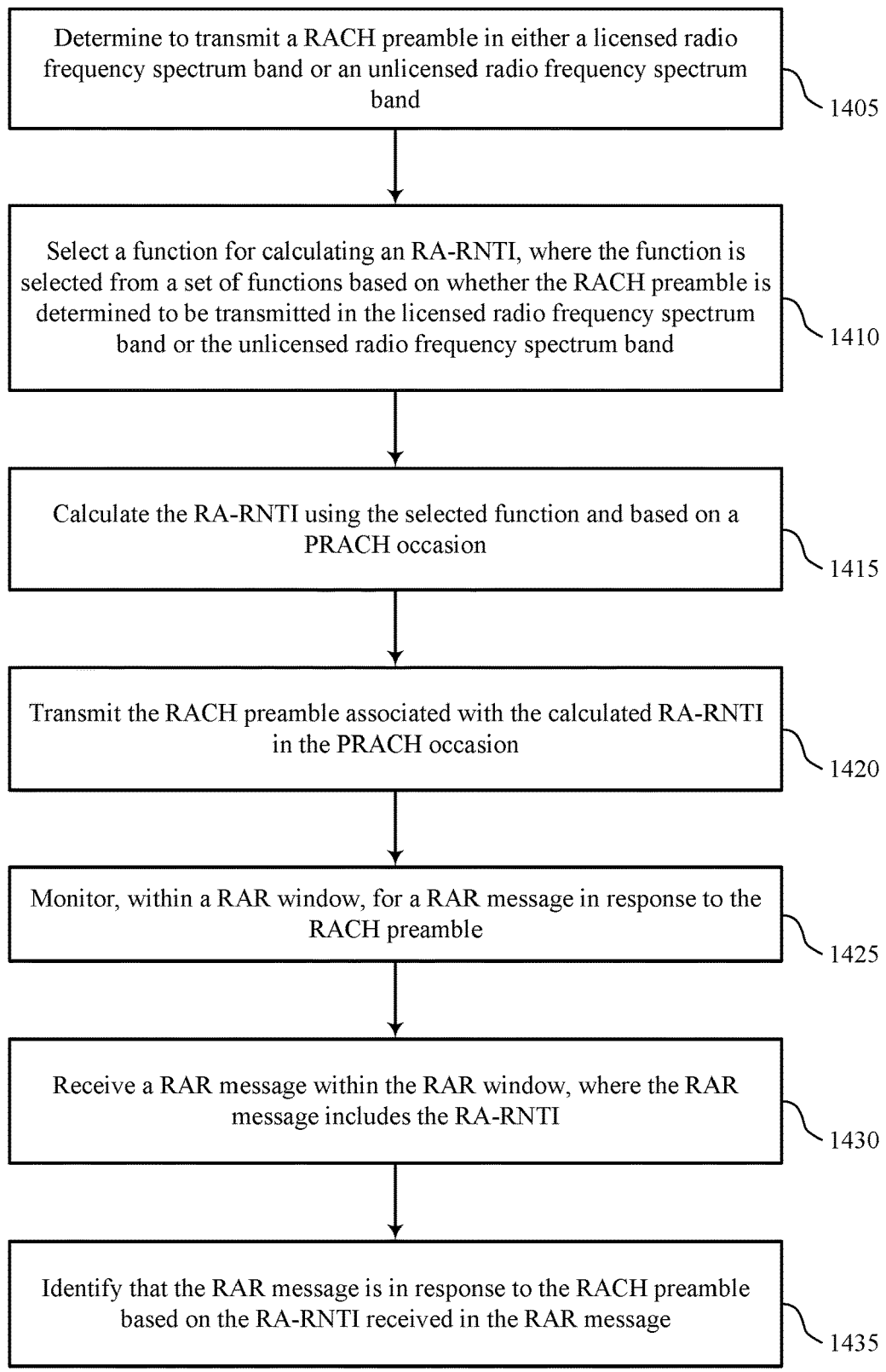

FIG. 14 shows a flowchart illustrating an example method 1400 that supports RAR reception. The operations of method 1400 may be implemented by a UE 115 or its components as described herein. For example, the operations of method 1400 may be performed by a RAR component as described with reference to FIG. 7. In some implementations, a UE may execute a set of instructions to control the functional elements of the UE to perform the functions described below. Additionally, or alternatively, a UE may perform aspects of the functions described below using special-purpose hardware.

At 1405, the UE may determine to transmit a RACH preamble in either a licensed radio frequency spectrum band or an unlicensed radio frequency spectrum band. The operations of 1405 may be performed according to the methods described herein.

At 1410, the UE may select a function for calculating an RA-RNTI, where the function is selected from a set of functions based on whether the RACH preamble is determined to be transmitted in the licensed radio frequency spectrum band or the unlicensed radio frequency spectrum band. The operations of 1410 may be performed according to the methods described herein.

At 1415, the UE may calculate the RA-RNTI using the selected function and based on a PRACH occasion. The operations of 1415 may be performed according to the methods described herein.

At 1420, the UE may transmit the RACH preamble associated with the calculated RA-RNTI in the PRACH occasion. The operations of 1420 may be performed according to the methods described herein.

At 1425, the UE may monitor, within a RAR window, for a RAR message in response to the RACH preamble. The operations of 1425 may be performed according to the methods described herein.

At 1430, the UE may receive a RAR message within the RAR window, where the RAR message includes the RA-RNTI. The operations of 1430 may be performed according to the methods described herein.

At 1435, the UE may identify that the RAR message is in response to the RACH preamble based on the RA-RNTI received in the RAR message. The operations of 1435 may be performed according to the methods described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person/one having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communications, comprising:
   one or more memories storing processor-executable code; and
   one or more processors coupled with the one or more memories and individually or collectively operable to execute the code to cause the apparatus to:
      output a random access preamble for transmission in a first physical random access channel (PRACH) occasion; and
      obtain a first portion of a random access response (RAR) message within a RAR window, the first portion of the RAR message comprising a timing information indicator, wherein the timing information indicator comprises a last portion of a system frame number (SFN) corresponding to the first PRACH occasion.

2. The apparatus of claim 1, wherein the one or more processors are configured to communicate with a base station using information in the first portion of the RAR message associated with whether the first portion of the RAR message is in response to the random access preamble.

3. The apparatus of claim 1, wherein a length of the RAR window is at least 10 milliseconds.

4. The apparatus of claim 1, wherein the one or more processors operate according to a two-step random access procedure.

5. The apparatus of claim 4, wherein the one or more processors are configured to switch to operate according to a four-step random access procedure associated with a second portion of the RAR message in response to the random access preamble not being received within the RAR window.

6. The apparatus of claim 1, wherein the one or more processors operate according to a random access procedure in an unlicensed radio frequency spectrum band.

7. The apparatus of claim 1, wherein the one or more processors are configured to:
   obtain monitoring information for the first portion of the RAR message within the RAR window, wherein obtaining the first portion of the RAR message is associated with the monitoring information.

8. The apparatus of claim 1, wherein the one or more processors are configured to:
   obtain monitoring information for the first portion of the RAR message on a primary cell and at least one of one or more secondary cells and one or more sub-bands.

9. The apparatus of claim 1, wherein the last portion of the SFN corresponding to the first PRACH occasion comprises one or more least significant bits of the SFN.

10. The apparatus of claim 9, wherein the one or more least significant bits of the SFN comprises two least significant bits of the SFN.

11. The apparatus of claim 1, wherein the last portion of the SFN corresponding to the first PRACH occasion comprises a last two bits of the SFN.

12. The apparatus of claim 1, wherein the one or more processors system are configured to:
   identify a plurality of PRACH occasions for transmitting the random access preamble; and
   select the first PRACH occasion from the plurality of PRACH occasions for transmitting the random access preamble, wherein the first PRACH occasion comprises an earliest available PRACH occasion of the plurality of PRACH occasions.

13. The apparatus of claim 1, wherein the one or more processors are configured to calculate a radio network temporary identifier (RNTI) associated with the first PRACH occasion.

14. The apparatus of claim 1, wherein:
   the first portion of the RAR message corresponds to downlink control information (DCI); and
   the timing information indicator corresponds to a field in the DCI.

15. The apparatus of claim 1, wherein:
   the random access preamble corresponds to a random access message 1 in a four-step random access procedure or a random access message A (msgA) in a two-step random access procedure; and
   the first portion of the RAR message corresponds to a random access message 2 in the four-step random access procedure or a random access message B (msgB) in the two-step random access procedure.

16. The apparatus of claim 1, wherein the first portion of the RAR message is identified by a radio network temporary identifier (RNTI).

17. The apparatus of claim 1, wherein at least a portion of the first portion of the RAR message is scrambled using a radio network temporary identifier (RNTI).

18. The apparatus of claim 1, wherein the apparatus is included in a user equipment (UE).

19. The apparatus of claim 1, wherein the first portion of the RAR message is obtained within an extended RAR window.

20. An apparatus for wireless communications, comprising:
   one or more memories storing processor-executable code; and
   one or more processors coupled with the one or more memories and individually or collectively operable to execute the code to cause the apparatus to:
      obtain a random access preamble in a first physical random access channel (PRACH) occasion, the first PRACH occasion corresponding to a system frame number (SFN); and
      output, in response to the random access preamble, a first portion of a random access response (RAR)

message for transmission within a RAR window, the first portion of the RAR message comprising a timing information indicator corresponding to the random access preamble, the timing information indicator comprising a last portion of the SFN corresponding to the PRACH occasion.

21. The apparatus of claim 20, wherein the one or more processors are configured to communicate with a user equipment (UE) using information transmitted in the first portion of the RAR message associated with the RAR message being in response to the random access preamble.

22. The apparatus of claim 20, wherein a length of the RAR window is at least 10 milliseconds.

23. The apparatus of claim 20, wherein the one or more processors operate according to a two-step random access procedure.

24. The apparatus of claim 20, wherein the one or more processors operate according to a random access procedure in an unlicensed radio frequency spectrum band.

25. The apparatus of claim 20, wherein the last portion of the SFN corresponding to the first PRACH occasion comprises one or more least significant bits of the SFN.

26. The apparatus of claim 25, wherein the one or more least significant bits of the SFN comprises two least significant bits of the SFN.

27. The apparatus of claim 20, wherein the last portion of the SFN corresponding to the first PRACH occasion comprises a last two bits of the SFN.

28. The apparatus of claim 20, wherein:
the first portion of the RAR message corresponds to downlink control information (DCI); and
the timing information indicator corresponds to a field in the DCI.

29. The apparatus of claim 20, wherein the one or more processors are configured to scramble at least a portion of the first portion of the RAR message using a radio network temporary identifier (RNTI).

30. A method for wireless communications at a user equipment (UE), comprising:
transmitting a random access preamble for transmission in a first physical random access channel (PRACH) occasion; and
receiving, from a base station, a first portion of a random access response (RAR) message within a RAR window, the first portion of the RAR message comprising a timing information indicator, wherein the timing information indicator comprises a last portion of a system frame number (SFN) corresponding to the first PRACH occasion.

31. The method of claim 30, wherein the first portion of the RAR message is received within an extended RAR window.

32. The method of claim 30, further comprising:
receiving monitoring information or the first portion of the RAR message within the RAR window, wherein receiving the first portion of the RAR message is associated with the monitoring information.

33. The method of claim 30, wherein the UE operates according to a two-step random access procedure.

34. The method of claim 33, wherein the UE is configured to switch to operate according to a four-step random access procedure associated with a second portion of the RAR message in response to the random access preamble not being received within the RAR window.

35. The method of claim 30, wherein the UE operates according to a random access procedure in an unlicensed radio frequency spectrum band.

36. The method of claim 30, wherein the UE is configured to calculate a radio network temporary identifier (RNTI) associated with the first PRACH occasion.

37. The method of claim 30, wherein:
the random access preamble corresponds to a random access message 1 in a four-step random access procedure or a random access message A (msgA) in a two-step random access procedure; and
the first portion of the RAR message corresponds to a random access message 2 in the four-step random access procedure or a random access message B (msgB) in the two-step random access procedure.

38. A method for wireless communications, comprising:
receiving, from a user equipment (UE), a random access preamble in a first physical random access channel (PRACH) occasion, the first PRACH occasion corresponding to a system frame number (SFN); and
transmitting, to the UE and in response to the random access preamble, a first portion of a random access response (RAR) message for transmission within a RAR window, the first portion of the RAR message comprising a timing information indicator corresponding to the random access preamble, the timing information indicator comprising a last portion of the SFN corresponding to the PRACH occasion.

39. The method of claim 38, wherein a length of the RAR window is at least 10 milliseconds.

40. The method of claim 38, wherein the last portion of the SFN corresponding to the first PRACH occasion comprises one or more least significant bits of the SFN.

41. The method of claim 40, wherein the one or more least significant bits of the SFN comprises two least significant bits of the SFN.

42. The method of claim 38, wherein:
the first portion of the RAR message corresponds to downlink control information (DCI); and
the timing information indicator corresponds to a field in the DCI.

* * * * *